US011615520B2

(12) United States Patent
Nogami

(10) Patent No.: US 11,615,520 B2
(45) Date of Patent: Mar. 28, 2023

(54) INFORMATION PROCESSING APPARATUS, INFORMATION PROCESSING METHOD OF INFORMATION PROCESSING APPARATUS, AND STORAGE MEDIUM

(71) Applicant: CANON KABUSHIKI KAISHA, Tokyo (JP)

(72) Inventor: Atsushi Nogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 17/207,486

(22) Filed: Mar. 19, 2021

(65) Prior Publication Data

US 2021/0312605 A1 Oct. 7, 2021

(30) Foreign Application Priority Data

Apr. 6, 2020 (JP) .............................. JP2020-068321

(51) Int. Cl.
| | |
|---|---|
| *G06K 9/00* | (2022.01) |
| *G06T 7/00* | (2017.01) |
| *G06T 5/00* | (2006.01) |

(52) U.S. Cl.
CPC ............ *G06T 7/0004* (2013.01); *G06T 5/008* (2013.01); *G06T 5/009* (2013.01); *G06T 2207/30184* (2013.01)

(58) Field of Classification Search
CPC ....... G06T 7/0004; G06T 5/008; G06T 5/009; G06T 2207/30184; G06T 2207/10004;
(Continued)

(56) References Cited

U.S. PATENT DOCUMENTS 9,558,550 B2 *  1/2017  Klauschen ............. G16H 30/40
2018/0292328 A1   10/2018  Karube
(Continued)

FOREIGN PATENT DOCUMENTS

JP      2003-035528 A     2/2003
JP      2018-198053 A    12/2018

OTHER PUBLICATIONS

Vijay Badrinarayanan, Alex Kendall, and Roberto Cipolla, "SegNet: A Deep Convolutional Encoder-Decoder Architecture for Image Segmentation", IEEE Transactions on Pattern Analysis and Machine Intelligence, vol. 39, No. 12, Dec. 2017.
(Continued)

*Primary Examiner* — Dhaval V Patel
(74) *Attorney, Agent, or Firm* — Canon U.S.A., Inc. IP Division

(57) ABSTRACT

An information processing apparatus includes one or more processors that function as the following units: a detection unit configured to detect a defect occurring in a structure by using local information about the structure based on a first image of the structure; a first determination unit configured to determine a global state of the structure based on a result of detection of the defect by the detection unit and global information indicating information about a wider area than an area of the structure indicated by the local information, the global information being based on a second image having a lower resolution than that of the first image; and a second determination unit configured to determine a degree of damage to a predetermined area of the structure based on a result of determination made by the first determination unit of the global state of the structure.

20 Claims, 16 Drawing Sheets

(58) Field of Classification Search
CPC . G06T 2207/20016; G06T 2207/20021; G06T 2207/20084; G06T 2207/30132
See application file for complete search history.

(56) References Cited

U.S. PATENT DOCUMENTS

| | | | |
|---|---|---|---|
| 2020/0118263 A1* | 4/2020 | Nogami | G06T 7/11 |
| 2020/0284686 A1* | 9/2020 | Li | G01M 5/0091 |
| 2021/0082092 A1* | 3/2021 | Sargent | G06T 5/50 |
| 2022/0028052 A1* | 1/2022 | Li | G03F 7/705 |

OTHER PUBLICATIONS

Xu Hongyan et al: "Automatic Bridge Crack Detection Using a Convolutional Neural Network", Applied Sciences, , pp. 1-14, Jul. 18, 2019, vol. 9, No. 14.

Arun Mohan et al: Crack detection using image processing: A critical review and analysis: Alexandria Engineering Journal: pp. 787-798, Jun. 1, 2018, vol. 57, No. 2.

* cited by examiner

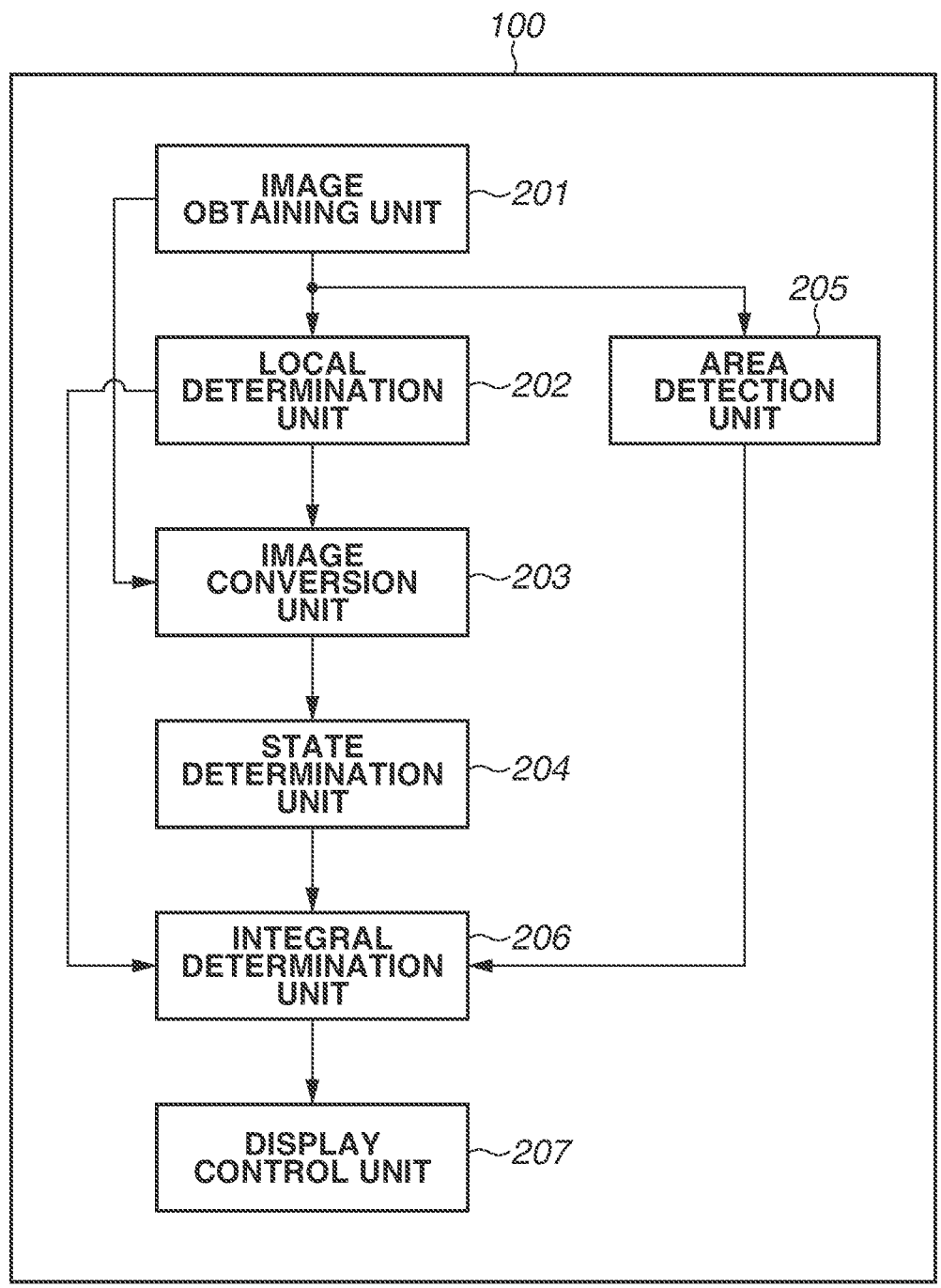

FIG.3

| DAMAGE DEGREE RANK | CRACK | STATE OF CRACKING | WATER LEAKAGE/ FREE LIME | |
|---|---|---|---|---|
| a | NO | NO | NO | |
| b | CRACK WIDTH 0.1 mm OR LESS | ONLY IN ONE DIRECTION | NO |  |
| c | CRACK WIDTH 0.1 mm OR LESS | IN GRID PATTERN (GRID SPACING: 50 cm OR MORE) | NO |  |
| d | CRACK WIDTH 0.2 mm OR LESS | ONLY IN ONE DIRECTION | NO |  |
| e | CRACK WIDTH 0.2 mm OR LESS | IN GRID PATTERN (GRID SPACING: 20 cm TO 50 cm) | NO | 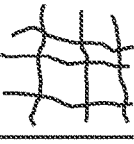 |
| f | CRACK WIDTH 0.2 mm OR LESS | ONLY IN ONE DIRECTION | YES |  |
| g | CRACK WIDTH 0.2 mm OR LESS | IN GRID PATTERN (GRID SPACING: 20 cm TO 50 cm) | YES | 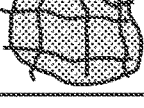 |
| ⋮ | ⋮ | ⋮ | ⋮ | ⋮ |

HIGH RESOLUTION IMAGE

LOW RESOLUTION IMAGE

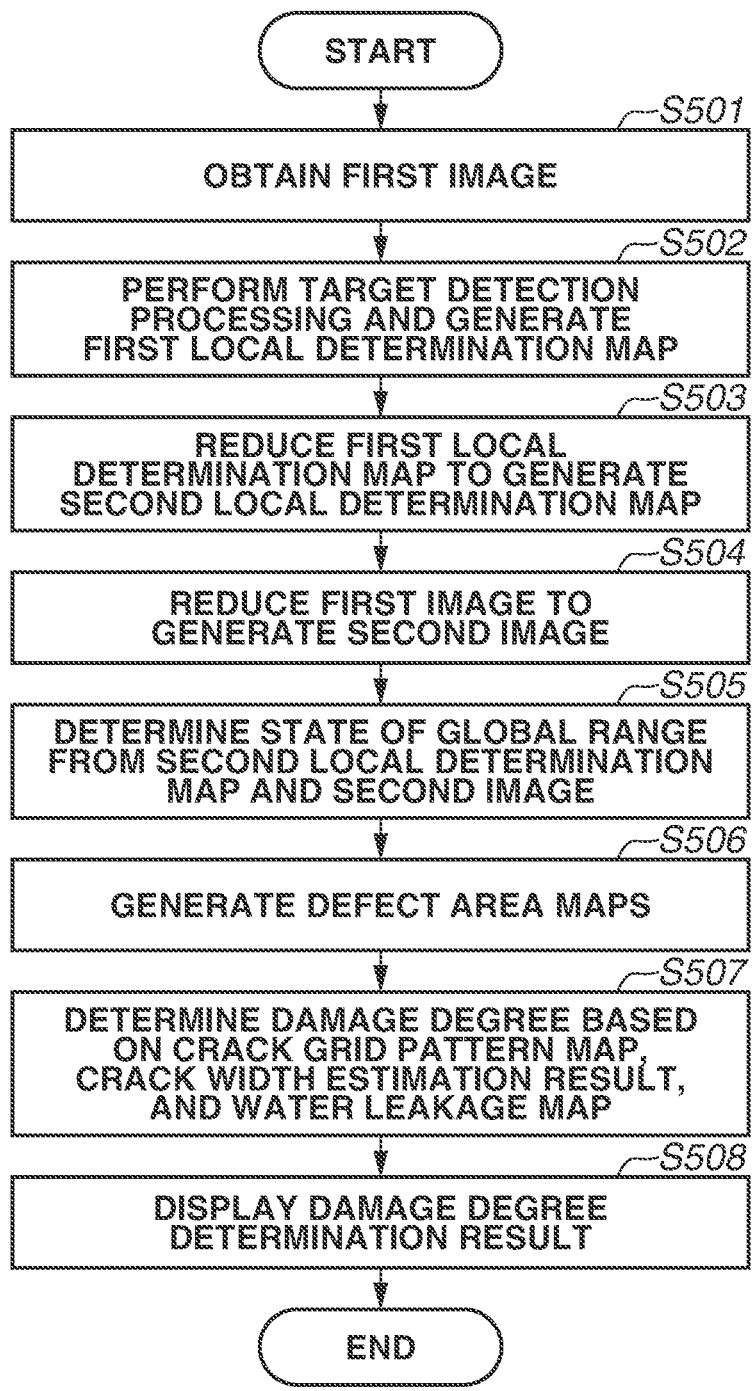

INFORMATION PROCESSING APPARATUS, INFORMATION PROCESSING METHOD OF INFORMATION PROCESSING APPARATUS, AND STORAGE MEDIUM

BACKGROUND

Field of the Invention

The present invention relates to an information processing apparatus, an information processing method of the information processing apparatus, and a storage medium.

Description of the Related Art

In inspecting a concrete structure, partial damage degrees of the structure are determined based on the state of the occurrence of cracks in concrete walls. For example, the periodic bridge inspection guidelines formulated by the Japanese Ministry of Land, Infrastructure, Transport and Tourism discusses classification of damage degree ranks of a concrete wall based on the crack widths of occurred cracks, the grid pattern of cracks, and the occurrence of water leakage and free lime.

To reduce work cost and avoid worker-by-worker variations in the determination of the damage degree, automatization of the determination of the damage degree by an information processing apparatus has been desired. For example, a conventional technique for automatizing the determination of the damage degree is discussed in Japanese Patent Application Laid-Open No. 2003-35528. Japanese Patent Application Laid-Open No. 2003-35528 discusses a method for extracting cracks from an image through image processing, and determining a damage degree based on the extracted cracks. According to Japanese Patent Application Laid-Open No. 2003-35528, the damage degree is determined based on the directions of the extracted cracks.

SUMMARY OF THE INVENTION

An information processing apparatus includes one or more processors that function as the following units: a detection unit configured to detect a defect occurring in a structure by using local information about the structure based on a first image of the structure; a first determination unit configured to determine a global state of the structure based on a result of detection of the defect by the detection unit and global information indicating information about a wider area than an area of the structure indicated by the local information, the global information being based on a second image having a lower resolution than that of the first image; and a second determination unit configured to determine a degree of damage to a predetermined area of the structure based on a result of determination made by the first determination unit of the global state of the structure.

Further features of the present invention will become apparent from the following description of exemplary embodiments with reference to the attached drawings.

BRIEF DESCRIPTION OF THE DRAWINGS

FIG. 2 is a block diagram illustrating a functional configuration example of the information processing apparatus.

FIG. 3 is a diagram for describing damage degree ranks.

FIG. 5 is a flowchart illustrating an information processing method.

DESCRIPTION OF THE EMBODIMENTS

Take the case of automatically determining the damage degree based on crack widths and the grid pattern of cracks as discussed in the foregoing bridge inspection guidelines formulated by the Japanese Ministry of Land, Infrastructure, Transport and Tourism. To detect cracks in an image and estimate their crack widths, information about local ranges of a high resolution image is to be used. By contrast, to determine the grid pattern of cracks, information about a global range including a plurality of cracks is to be used. However, Japanese Patent Application Laid-Open No. 2003-35528 does not discuss any method for determining the damage degree based on local determinations and global determinations.

Exemplary embodiments described below deal with techniques for enabling determination of a state of a global range based on local range and the global range.

The exemplary embodiments of the present invention will be described in detail below with reference to the accompanying drawings. The configurations described in the following exemplary embodiments are representative examples, and the scope of the present invention is not necessarily limited to such specific configurations. Each of the embodiments of the present invention described below can be implemented solely or as a combination of a plurality of the embodiments or features thereof where necessary or where the combination of elements or features from individual embodiments in a single embodiment is beneficial.

(Hardware Configuration)

Figure 1:
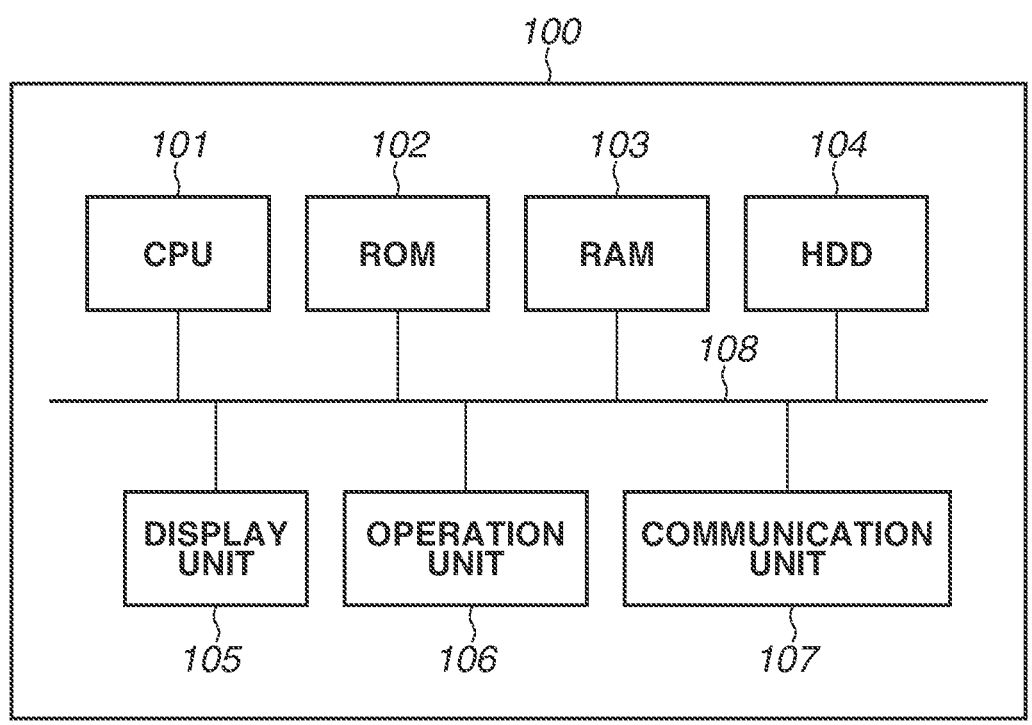
FIG. 1 is a block diagram illustrating a hardware configuration example of an information processing apparatus.

A first exemplary embodiment of the present invention will be described below. FIG. 1 is a block diagram illustrating a hardware configuration example of an information processing apparatus 100 according to the present exemplary embodiment. The information processing apparatus 100 includes a central processing apparatus (CPU) 101, a read-only memory (ROM) 102, a random access memory (RAM) 103, a hard disk drive (HDD) 104, a display unit 105, an operation unit 106, a communication unit 107, and a system bus 108. The CPU 101 performs calculations and logical determinations for various types of processing, and controls the components connected to the system bus 108. The ROM 102 is a program memory and stores a program for the CPU 101 to exercise controls including various processing procedures to be described below. The RAM 103 is used as temporary storage areas such as a main memory and a work area of the CPU 101. The program memory may be implemented by loading a program from an external storage device connected to the information processing apparatus 100 into the RAM 103.

The HDD 104 is a hard disk for storing electronic data and programs. An external storage device may be used to play a role similar to that of the HDD 104. For example, the external storage device can be implemented by a medium (recording medium) and an external storage drive for accessing the medium. Examples of such a medium include a flexible disk (FD), a compact disc read-only memory (CD-ROM), a digital versatile disc (DVD), a Universal Serial Bus (USB) memory, a magneto-optical (MO) disc, and a flash memory. The external storage device may be a network-connected server apparatus.

Examples of the display unit 105 include a cathode-ray tube (CRT) display and a liquid crystal display. The display unit 105 displays an image on a display screen. The display unit 105 may be an external device connected to the information processing apparatus 100 in a wired or wireless manner. The operation unit 106 includes a keyboard and a mouse, and accepts various operations made by the user. The communication unit 107 performs wired or wireless bidirectional communication with another information processing apparatus, a communication device, or an external storage device by using conventional communication techniques.

The information processing apparatus 100 determines, for example, the damage degree of a concrete wall surface of a piece of infrastructure. As employed herein, "wall surfaces" are not necessarily limited to surfaces built in a direction perpendicular to or crossing the ground surface, and may include surfaces situated at a horizontal or near horizontal angle with respect to the ground surface in general, like a floor slab of a bridge. The damage degree to be determined by the information processing apparatus 100 will be described with reference to FIG. 3. FIG. 3 illustrates determination criteria for a damage degree rank. The determination criteria for the damage degree rank in FIG. 3 are intended to determine the damage degree from crack widths, the grid pattern of cracks, and the occurrence of water leakage and free lime. For example, if a concrete wall surface has cracks of 0.1 mm or less in width, the cracks are only in one direction, and there is no occurrence of water leakage or free lime, the damage degree rank of the concrete wall surface is determined as damage degree rank b. If a concrete wall surface has cracks of 0.2 mm or less in width, the cracks are in a grid pattern, and there is no occurrence of water leakage or free lime, the damage degree rank of the concrete wall surface is determined as damage degree rank e. The information processing apparatus 100 outputs such a damage degree rank for each partial area of an image to determine the damage degree.

Figure 4A:
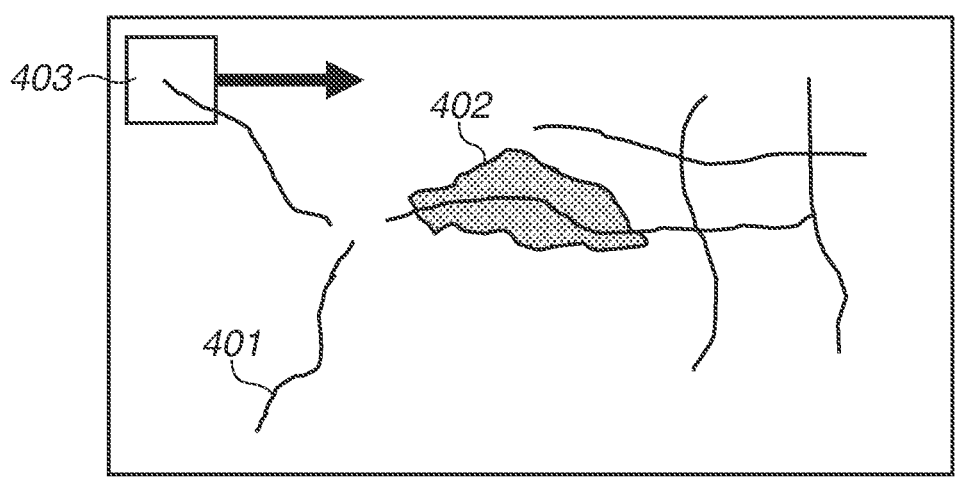
FIGS. 4A and 4B are diagrams for describing images.

Next, a specific example of a concrete wall surface image to determine the damage degree will be described with reference to FIGS. 4A and 4B. FIG. 4A illustrates a wall surface image of a piece of infrastructure, e.g., an image of a bridge floor slab. The floor slab has cracks 401 and water leakage 402. The image of FIG. 4A is an image captured in high resolution so that the cracks in the concrete wall surface can be seen. An inspection image of a concrete wall surface is captured in high resolution since a high-precision image where cracks having a width of, e.g., 0.1 mm can be observed is to be captured. Specifically, the image of the concrete wall surface is captured in resolution such that the actual size per pixel is 1 mm or so. To capture an image of a wall surface of a large piece of infrastructure in such high resolution, a plurality of images of the wall surface is captured section by section and connected into an image. FIG. 4A illustrates an image thus generated, which is large in size because of being generated by connecting a plurality of images. For example, if the floor slab to be imaged has an actual size of 10 m×20 m, an image of 1 mm per pixel in resolution is as large as 10000×20000 pixels.

For the sake of automatic damage degree determination, processing of detecting cracks and estimating crack widths (crack detection processing) is performed on such a high resolution image. In performing the crack detection processing on a large image such as that of FIG. 4A, the processing is performed on each partial image while sliding a processing window, the results from the partial images are integrated to generate a processing result. For example, FIG. 4A illustrates a detection window 403 for detecting cracks, and the crack detection processing is performed on the image in the detection window 403. The crack detection processing on a large image such as that of FIG. 4A is performed by performing such partial detection processing while changing the position of the detection window 403, and integrating the detection results.

By contrast, whether or not cracks are in a grid pattern is to be determined based on information about a relatively wide range. For example, to determine a grid pattern of cracks with a grid spacing of 50 cm from a 1-mm-per-pixel image, the determination is to be made based on information about a range wider than 500×500 pixels (such as a range of 1000×1000 pixels). If an image of this size is difficult to simply process, the image is reduced before the determination processing. FIG. 4B illustrates an image obtained by reducing the image of FIG. 4A. Unlike the high resolution image of FIG. 4A, the reduced image of FIG. 4B is a low resolution image.

Figure 4B:
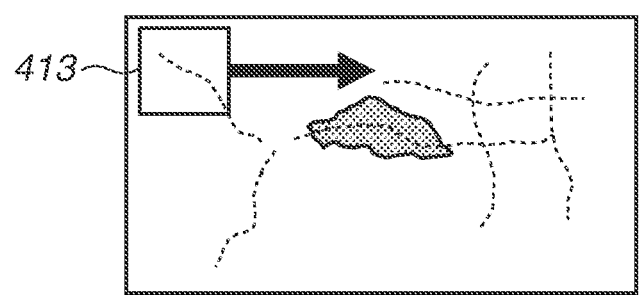

FIG. 4B illustrates a determination windrow 4B for determining whether cracks are in a grid pattern. In the example of FIG. 4B, whether cracks in the determination window 413 are in a grid pattern is determined based on the image in the determination window 413. The determination window 413 has the same size as that of the detection window 403 in FIG. 4A, but is intended for a low resolution image and thus covers an image of a wider range than the detection window 403 does. In such a manner, the state of cracking can be determined from information about a wide range.

However, cracks are thin and can only be resolved up to a subpixel level even in the high resolution image of FIG. 4A. In the image into which the original high resolution image is reduced like in FIG. 4B, cracks can therefore disappear or become extremely difficult to identify. FIG. 4B illustrates cracks in dotted lines, which indicates the state where the cracks are less visible due to the reduction of the image resolution. The state of cracking in such an image is extremely difficult to determine.

To avoid such a problem, the information processing apparatus 100 determines the state of configuration of cracking by using a map into which crack detection results are reduced.

(Functional Configuration)

FIG. 2 is a block diagram illustrating a functional configuration example of the information processing apparatus 100 according to the present exemplary embodiment. The information processing apparatus 100 includes an image obtaining unit 201, a local determination unit 202, an image conversion unit 203, a state determination unit 204, an area detection unit 205, an integral determination unit 206, and a display control unit 207. These functional units are implemented by the CPU 101 loading programs stored in the ROM 102 into the RAM 103 and executing the programs to perform processing according to a flowchart to be described below. The CPU 101 then stores the execution results of respective processes into the RAM 103 or the HDD 104. If, for example, hardware is configured as an alternative to the software processing using the CPU 101, arithmetic units and circuits corresponding to the processing of the respective functional units described here can be configured.

Next, the functional units illustrated in FIG. 2 will be described. The image obtaining unit 201 obtains a determination target image to determine the damage degree. This determination target image will be referred to as a first image. The local determination unit 202 detects cracks and estimate crack widths from the first image, and generates a first local determination map. The image conversion unit 203 performs reduction processing on the first image to generate a second image, and converts the first local determination map into a second local determination map. The state determination unit 204 determines the state of cracking from the second image and the second local determination map, and generates a state map. The area detection unit 205 detects defect areas, such as water leakage and free lime, from the first image or the second image, and generates a defect area map. The integral determination unit 206 determines the damage degree based on the information about the crack widths, the information about the state of cracking, and the information about the defect area map. The display control unit 207 controls display of the determination target image and the information about the damage degree on the display unit 105. Note that all of these functional units do not need to be included in the information processing apparatus 100, and at least some of the functions thereof may be implemented by an external apparatus connectable to the information processing apparatus 100.

(Processing)

Figure 6:
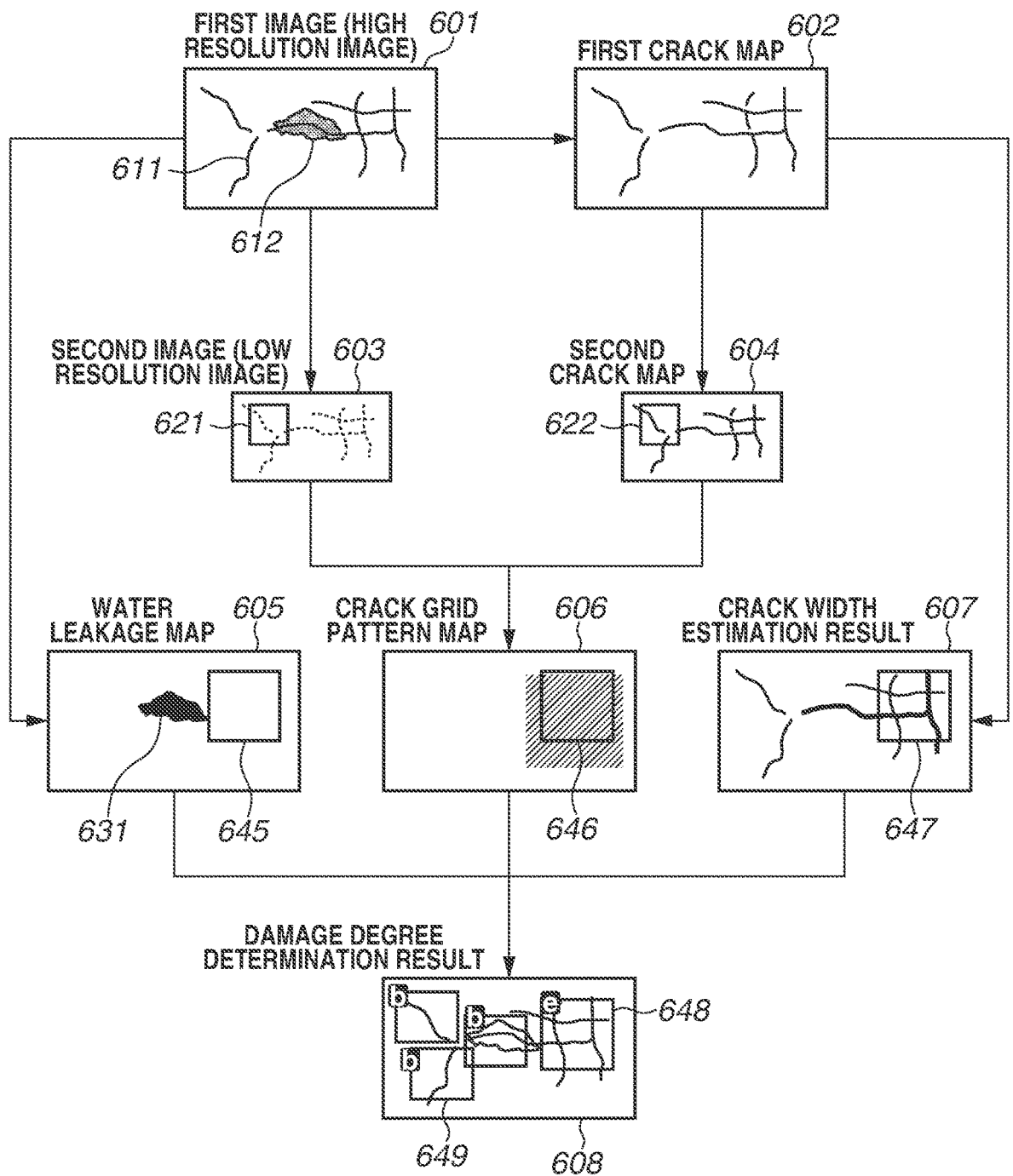
FIG. 6 is a diagram for describing processing of the information processing apparatus.

FIG. 5 is a flowchart illustrating an information processing method of the information processing apparatus 100. FIG. 6 illustrates a specific case example of processing from input of an image to determination of the damage degree, which is performed by the information processing apparatus 100. The processing by the information processing apparatus 100 will be described below with reference to FIGS. 5 and 6.

(Image Obtaining Unit)

In step S501, the image obtaining unit 201 initially obtains a determination target image to determine the damage degree. This determination target image is a high resolution image as described in conjunction with FIG. 4A. The high resolution image is generated by connecting a plurality of images captured of respective portions of a concrete wall surface so that a high-precision image of the concrete wall surface is captured. As described above, this high resolution image is referred to as a first image. FIG. 6 illustrates a first image 601 as an image to be subjected to the processing described below. As in FIG. 4A, the first image 601 includes cracks 611 and water leakage 612.

(Local Determination Unit)

In step S502, the local determination unit 202 performs target detection processing based on local ranges of the first image 601, and generates a first local determination map based on results of the detection processing. Using the high resolution image as a processing target, the local determination unit 202 detects targets based on the local ranges of the first image 601. The targets to be detected from the first image 601 are cracks in the concrete wall surface. The local determination unit 202 further determines the attributes of the respective results of the detection processing from the first image (high resolution image) 601 and the detection results. As the attributes of the results of the detection processing, the local determination unit 202 estimates the crack widths of the detected cracks. Since detailed image information is desirably used to estimate the crack widths, the local determination unit 202 estimates the crack widths through local determination processing using the high resolution image. The local determination unit 202 outputs a first local determination map as a result of the processing of the first image.

The local determination unit 202 generates a first local determination map having the same image size as that of the first image 601 that is a high resolution image. The first local determination map will also be referred to as a first crack map. Processing for generating the first local determination map (first crack map) by the local determination unit 202 will now be described.

To generate the first crack map, the local determination unit 202 performs crack detection processing on the first image 601. As described in conjunction with FIG. 4A, since the first image has high resolution and large image size, it is difficult to detect the cracks in the entire image area through one operation. The local determination unit 202 therefore performs the crack detection processing on partial images in local ranges of the first image, and integrates the results from the partial images to generate the first crack map. For example, as in FIG. 4A, the local determination unit 202 performs the crack detection processing on the entire first image by sliding the detection window 403 for detecting cracks over the first image.

The crack detection processing for a partial image (image in the detection window 403) is performed, for example, by applying a crack detection model trained for cracks by machine learning in advance to the partial image. Specifically, the crack detection model is generated by training with training data that includes pairs of images and teaching data indicating crack positions in the images in advance, using a machine learning algorithm such as a neural network. The crack detection model here outputs a score (crack score) indicating the likelihood of being a crack for each pixel of an input image. The local determination unit 202 applies the crack detection model to the partial images of the first image to calculate the crack scores of the respective pixels in the partial images. The local determination unit 202 then integrals the crack scores in the partial images to generate data containing the scores of the likelihood of being a crack of the respective pixels in the form of an image having the same size as that of the first image. The data containing the scores of the likelihood of being a crack of the pixels will hereinafter be referred to as a score map. The local determination unit 202 further performs threshold processing on the score map to leave only pixels that have a score higher than a threshold and are likely to be a crack, and performs line thinning to identify pixels (crack pixels) where cracks are. Through such processing, the local determination unit 202 generates a crack determination result of the first image. FIG. 6 illustrates a first crack map 602 as a result of the processing performed on the first image 601 by the local determination unit 202. The first crack map 602 is an image where crack pixels are represented in black (0) and pixels other than the crack pixels in white (255).

In the foregoing example, the local determination unit 202 has been described to perform the crack detection processing by the machine learning-based method. However, the crack detection processing may be performed by using other methods. For example, the local determination unit 202 may be configured to perform the crack detection processing using an edge detection technique using a filter, such as a Sobel operator. A 3×3-pixel filter is typically used for such a filter-based technique.

The local determination unit 202 further estimates the crack widths of the detected cracks for use in the determination of the damage degree by the integral determination unit 206 to be described below. As in the detection for the cracks, the local determination unit 202 estimates the crack widths by using the information about the local ranges of the first image 601. A method for estimating a crack width based on crack detection results and local image information can be implemented, for example, by a method discussed in Japanese Patent Application Laid-Open No. 2018-198053. Japanese Patent Application Laid-Open No. 2018-198053 discusses a method for extracting image features around a single crack based on the crack detection results, and estimating the width of the crack from the extracted image features. The local determination unit 202 can thereby estimate a maximum crack width of each crack. While the method discussed in Japanese Patent Application Laid-Open No. 2018-198053 determines the maximum crack width of each crack, the local determination unit 202 is not limited thereto. For example, the local determination unit 202 may determine a crack width at each crack pixel position based on the edge intensities of the pixels where cracks are present.

FIG. 6 illustrates a crack width estimation result 607 obtained by the local determination unit 202 estimating crack widths. The local determination unit 202 estimates the crack widths based on the local ranges of the first image 601, and generates the crack width estimation result 607. For convenience of illustration, the crack width estimation result 607 is illustrated to express the estimated crack widths by the thicknesses of the crack lines. However, the data on the crack widths may be stored in other formats. For example, the local determination unit 202 may configure the crack width data as an image where the values of the estimated crack widths are stored in the respective crack pixels.

In such a manner, the local determination unit 202 generates the first crack map 602 and the crack width estimation result 607 from the first image 601.

(Image Conversion Unit)

In steps S503 and S504, the image conversion unit 203 reduces the first local determination map (first crack map) 602 and the first image 601. The reduction processing is performed for the state determination unit 204 to be described below to determine the state of cracking (determine a grid pattern) based on images of global ranges.

The image conversion unit 203 reduces the first local determination map 602 and the first image 601 by using a common image enlargement and reduction algorithm, such as bilinear interpolation and nearest neighbor interpolation. The image conversion unit 203 reduces the first local determination map 602 to generate a second local determination map. The image conversion unit 203 also reduces the first image 601 to generate a second image. FIG. 6 illustrates a second image 603 that is a low resolution image into which the first image 601 is reduced, and a second crack map (second local determination map) 604 into which the first crack map (first local determination map) 602 is reduced. For example, the second image 603 and the second crack map 604 are images obtained by vertically and horizontally reducing the original images by 50% in size.

As described above, cracks are typically thin and can only be captured up to a subpixel level even in a high resolution image. In the images into which the original high resolution images are reduced, cracks can thus disappear or become extremely difficult to identify. In the second image 603 of FIG. 6, cracks are illustrated in dotted lines, which indicates that the cracks are less visible because of the image reduction. To determine whether the cracks are in a grid pattern based on the second image 603 is therefore extremely difficult, since the cracks may not be sufficiently observable in the second image 603 and the state of cracking is difficult to determine based on such an image. The state determination unit 204 thus determines the state of cracking by using the second crack map 604 into which the first crack map 602 is reduced as well as the second image 603. Being a reduced image of the first crack map 602 indicating only cracks, the second crack map 604 retains more crack information than the second image 603 does. The state determination unit 204 can more correctly determine the state of cracking by using the second crack map 604 as well than by using only the second image 603.

Figure 7A:
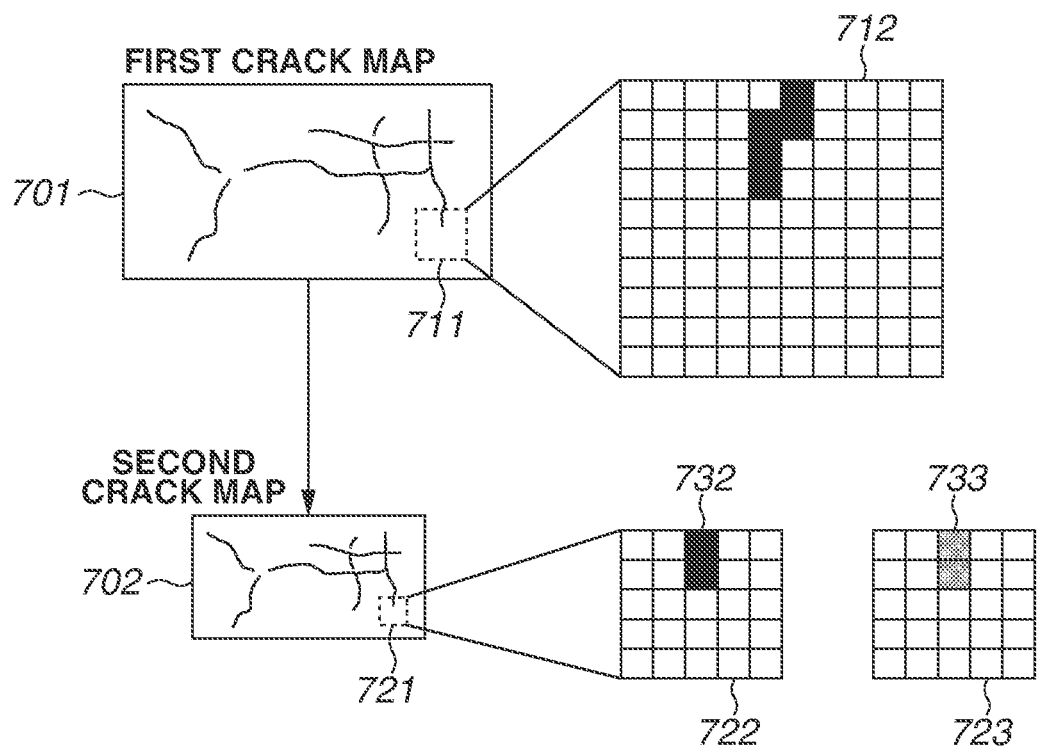
FIGS. 7A and 7B each are a diagram for describing processing by an image conversion unit.

The image conversion unit 203 can perform the reduction processing while preserving the crack information. An example of performing the reduction processing while preserving the crack information will now be described. In step S503, the image conversion unit 203 initially reduces the first local determination map 602 to generate the second local determination map 604. FIG. 7A illustrates how a first local determination map is reduced to generate a second local determination map. In FIG. 7A, the first local determination map is illustrated as a first crack map 701, and the second local determination map as a second crack map 702. For example, as illustrated in an enlarged view 712 of a dotted-lined frame 711 in FIG. 7A, cracks are stored in the first crack map 701 as one-pixel-width information. A dotted-lined frame 721 in the second crack map 702 indicates a portion of the reduced second crack map 702 corresponding to the dotted-lined frame 711 in the first crack map 701. If the first crack map 701 is reduced by using a common image enlargement and reduction algorithm, the image in the dotted-lined frame 721 of the second crack map 702 becomes like an enlarged view 723. In the enlarged view 723, information 733 indicating a crack is weak. Depending on the reduction ratio, pixels representing a crack can even be discontinuous or disappear. A reduction map where information 732 indicating a crack is clear as illustrated in an enlarged view 722 is desirably generated.

Figure 7B:
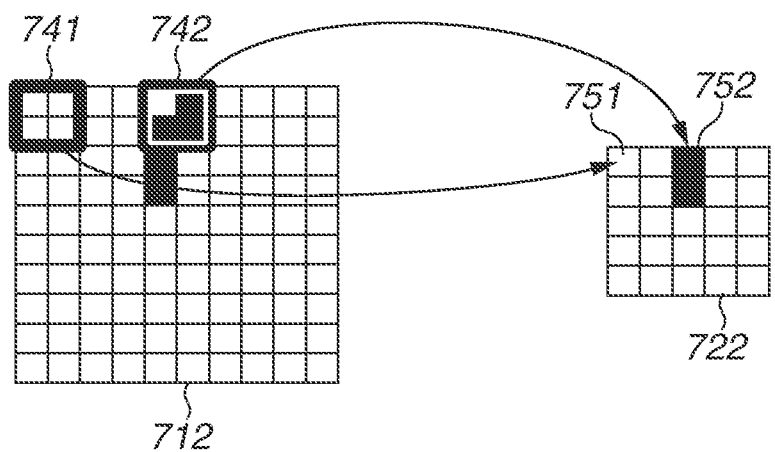

In view of this, the image conversion unit 203 generates the second local determination map 702 by applying thickening processing to the results of the detection processing included in the first local determination map 701 and then applying reduction processing to the thickened first local determination map 701. The image conversion unit 203 reduces the first crack map 701 so that the crack information in the first crack map 701 is preserved. For example, the image conversion unit 203 generates the second crack map 702 by applying the thickening processing to the cracks in the first crack map 701 and then applying the reduction processing to the thickened first crack map 701. Alternatively, the image conversion unit 203 reduces the first crack map 701 while leaving information indicating the presence of a crack within a predetermined range if any. For a specific description, FIG. 7B illustrates how the enlarged view 712 of FIG. 7A is reduced into the enlarged view 722. In FIG. 7B, the image conversion unit 203 reduces the image size to 50%. For that purpose, the image conversion unit 203 applies a 2×2 filter to the enlarged view 712. If crack information is included in the filter range, the image conversion unit 203 leaves the information in the reduced image without change. For example, since no crack is included in the range of a 2×2 filter 741, the image conversion unit 203 reduces the pixels into a pixel 751 indicating the absence of a crack (pixel value of 255). By contrast, since one or more crack pixels are included in the range of a filter range 742, the image conversion unit 203 reduces the pixels into a pixel 752 indicating the presence of a crack (pixel value of 0). In such a manner, the image conversion unit 203 can prevent the crack information from disappearing due to the reduction processing by duplicating representative values in the respective filter ranges of the first crack map 701 to generate the reduced image, i.e., the second crack map 702.

While an example of the method for reducing the first crack map 602 has been described above, a reduction algorithm for preserving crack information as much as possible can also be used in reducing the first image 601. For that purpose, any method that preserves image edges in the reduced image can be used. For example, in performing the reduction processing on the first image 601, the image conversion unit 203 may reduce the first image 601 by using a common reduction algorithm, and then apply edge enhancement processing to the reduced image. The resulting image can be used as the second image 603.

As described above, the image conversion unit 203 generates the second image 603 and the second crack map 604.

(State Determination Unit)

In step S505, the state determination unit 204 determines the state of a range (global range) wider than the foregoing local ranges of the second local determination map 604 and the second image 603. Through processing, the state determination unit 204 outputs a state map. The state determination unit 204 determines the state of cracking as the state of the global range. More specifically, the state determination unit 204 determines whether cracks in a partial area can be determined to be in a grid pattern. In the following description, as a specific example, the state map output from the state determination unit 204 will therefore also be referred to as a crack grid pattern map. In the following description, the state of cracking to be determined is whether cracks are in a grid pattern. However, this is not restrictive, and the state determination unit 204 may determine other states. For example, the state determination unit 204 may determine whether cracks included in a partial area are in a closed pattern as the determination of the state of the cracks in the partial area. The state of cracking to be determined by using information about a global range is thus desirably the state of configuration of cracking. In the example of determining whether cracks in a partial area are in a closed pattern, the integral determination unit 206 to be described below makes a damage degree determination, i.e., determines the damage degree rank by taking into account the information about the closed crack pattern as well.

While that cracks are in a grid pattern can be determined from the second local determination map 604 alone, the second image 603 can also be used as in the present exemplary embodiment to determine that the cracks are in a grid pattern by taking into account image features as well. This is expected to improve the determination accuracy of the grid pattern.

The processing by the state determination unit 204 will initially be described with reference to FIG. 6. FIG. 6 illustrates a state determination window 621 in the second image 603, and a state determination window 622 in the second crack map 604. The state determination windows 621 and 622 represent the same partial area in the original image (first image 601). By using such partial images, the state determination unit 204 determines the state of cracking in the partial area of the original image. The state determination unit 204 determines whether the cracks in the partial images are in a grid pattern, and generates a crack grid pattern map indicating a portion or portions where cracks are in a grid pattern by making such a determination on the entire image. FIG. 6 illustrates a state where the state determination unit 204 generates a crack grid pattern map 606. The state determination unit 204 determines the state of cracking based on the second image 603 and the second crack map 604, and generates the crack grid pattern map 606. In the crack grid pattern map 606 of FIG. 6, the hatched portion indicates where cracks are determined to be in a grid pattern (with a grid spacing of 20 cm to 50 cm).

The state determination windows 621 and 622 represent a wider range in the original image (first image 601) than the foregoing detection window 403 for local determination does. Suppose that the detection window 403 for the local determination unit 202 to detect cracks and the state determination window 621 of the state determination unit 204 have the same size on the respective images. Since the state determination window 621 of the state determination unit 204 is intended for the second image 603 that is a reduced image, the range where the state determination unit 204 makes a determination in the second image 603 is wider than the target range of the local determination unit 202. Processing for which detailed information included in an image is desirable, such as crack detection and crack width estimation, can thus make a local determination while processing for which global information is desirable, such as the determination of the state of configuration of cracking, can make a determination based on global information. Even in a case where cracks are detected through filter processing using a Sobel filter, the state determination windows 621 and 622 cover a wider range than that of the filter that has a size of 3×3 pixels, for example.

Specific processing where the state determination unit 204 determines whether cracks are in a grid pattern from the information about a wide range will now be described. The state determination unit 204 determines the state of cracking in a partial area by inputting a partial image of the second image 603 and a partial map of the second crack map 604 into a classifier trained in advance. The classifier determines whether a grid pattern of cracks is included in the input images. Any algorithm can be used as long as multi-class classification can be made with images as inputs. A specific algorithm of the classifier may include extracting a predetermined image feature amount from the input images and applying a machine learning algorithm, such as a nearest neighbor algorithm, a naïve Bayes algorithm, a decision tree, and a support vector machine thereto. The classifier may be a neural network trained to learn connection weight coefficients. A configuration using a neural network as the classifier will be described below with reference to FIG. 8.

Figure 8:
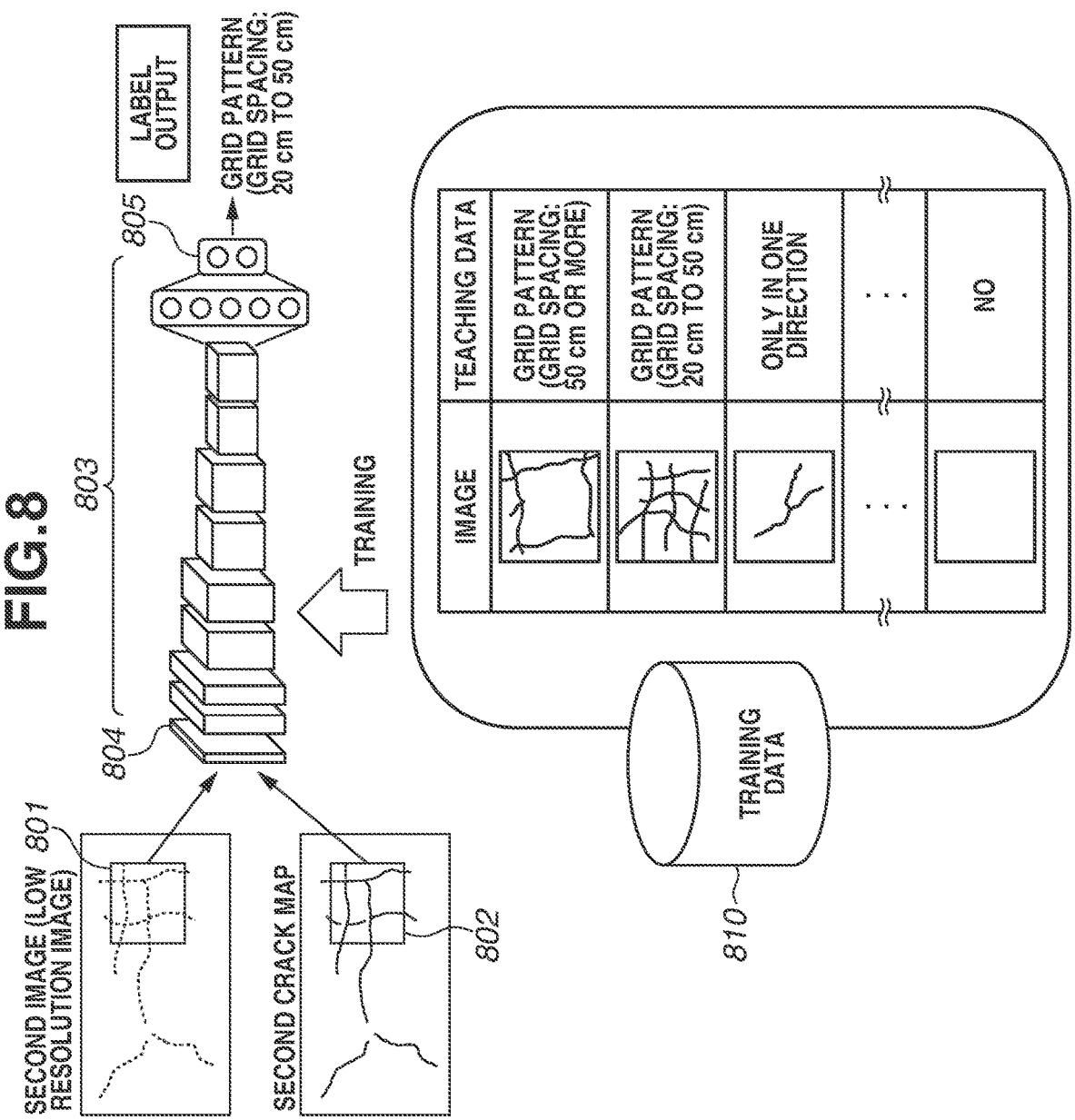
FIG. 8 is a diagram for describing a state determination unit.

In FIG. 8, a partial image 801 of the second image 603 and a partial map 802 of the second crack map 604 obtained from the state determination windows 621 and 622 are input to an input layer 804 of a neural network 803. Herein, the partial image 801 is a red-green-blue (RGB) three-channel image. The partial map 802 is a binary image indicating the positions of cracks, i.e., a one-channel image. With such images, a four-channel image into which the partial image 801 and the partial map 802 are combined is input into the input layer 804. The method for inputting the partial image

801 and the partial map 802 into the neural network 803 is not limited thereto. A neural network architecture for inputting the images into respective different input layers of the neural network may be employed.

In response to such an input, the neural network 803 outputs a grid pattern label from its output layer 805. There are four types of grid pattern labels "no", "only in one direction", "grid pattern (grid spacing: 50 cm or more)", and "grid pattern (grid spacing: 20 cm to 50 cm)" corresponding to the classifications of the state of cracking in FIG. 3. These grid pattern labels are examples of classifications based on the determination criteria for the damage degree rank in FIG. 3, and the types of grid pattern labels are not limited thereto. In FIG. 8, the cracks in the range of the partial image 801 are determined to be in a "grid pattern (grid spacing: 20 cm to 50 cm)". The classifier may determine whether cracks are in a grid pattern and numerically output the grid spacing. In such a case, the state determination unit 204 may generate a grid pattern label including the presence or absence of a grid pattern and the numerical value of the grid spacing.

As described above, the classifier of the state determination unit 204 determines the state of cracking. For example, the classifier can be trained in the following manner. FIG. 8 illustrates training data 810 for training the neural network 803. The training data 810 includes a large number of pairs of images and teaching data. The images included in the training data 810 are partial images of concrete wall surfaces. As in the data input to the neural network 803, the images are four-channel images each including an image and a crack map. Each image is given a grid pattern label indicating the state of cracking in the image as teaching data. The neural network 803 is trained by using such training data 810. The training is performed by modifying the weight coefficients of the neural network 803 so that errors between the determination results and the teaching data when the images in the training data 810 are input to the neural network 803 decrease.

In such a manner, the state determination unit 204 determines the state of cracking in a wider range than where the local determination unit 202 makes a determination. The state determination unit 204 generates the crack grid pattern map 606 by determining the states in the respective partial maps of the second crack map 604 and connecting the results. The crack grid pattern map 606 is a map where the determined grid pattern labels are stored in the respective pixels.

In determining the state of cracking, the state determination unit 204 may skip the state determination processing in partial areas where there is no crack. Specifically, the state determination unit 204 slides the state determination window 622, obtains a partial map of the second crack map 604, and if the obtained partial map is determined to include no crack, skip the state determination.

(Area Detection Unit)

To determine the damage degree based on the determination criteria for the damage degree rank in FIG. 3, the area detection unit 205 detects water leakage and free lime. In step S506, the area detection unit 205 detects defect areas, such as water leakage and free lime areas, from the first image 601. Water leakage and free lime can be detected by using an existing semantic segmentation technique. An example of such a technique is discussed in Vijay Badrinarayanan, Alex Kendall, and Roberto Cipolla "SegNet: A Deep Convolutional Encoder-Decoder Architecture for Image Segmentation", PAMI, 2017. By semantic segmentation, a classifier such as a neural network is trained with pairs of images and teaching data indicating detection target areas. Using the trained classifier, the area detection unit 205 then processes a detection target image to identify pixels to be detected in the detection target image, and generates a defect area map. Since conventional techniques can be used for semantic segmentation, a detailed description thereof will be omitted. To apply semantic segmentation to the detection of water leakage or free lime, a classifier such as a neural network is trained with training data including pairs of images and teaching data indicating water leakage areas, or pairs of images and teaching data indicating free lime areas. The area detection unit 205 detects water leakage areas or free lime areas (defect areas) in the first image 601 by using the trained classifier, and generates a defect area map. As a specific example of the defect area map, FIG. 6 illustrates a water leakage map 605 generated by detecting water leakage areas in the first image 601. The water leakage map 605 indicates a water leakage detection result 631 where the water leakage 612 is detected in the first image 601. As in the detection of water leakage, the area detection unit 205 also detects free lime areas and generates a free lime map, which is omitted in FIG. 6 for the convenience of illustration. Since free lime can be detected and the free lime map can used as with water leakage, a description thereof will be omitted.

Since the first image 601 is a high resolution image of large size, the area detection unit 205 divides the first image 601 into partial images, generates area detection results of the respective partial images, and then connects the area detection results of the partial images to generate an area detection result (defect area map). Water leakage and free lime can occur in various sizes. The area detection unit 205 can thus perform the area detection processing not only on the first image 601 (high resolution image) but also on the second image 603 (low resolution image), and integrate the results detected in the different images to generate water leakage and free lime detection results. This enables the area detection unit 205 to detect small-sized water leakage and free lime in the high resolution image, and large-sized water leakage and free lime in the low resolution image. The area detection unit 205 may detect water leakage and free lime only in the second image 603 if small-sized water leakage and free lime can be ignored.

While the concrete defects for the area detection unit 205 to detect in conformity to the determination criteria for the damage degree rank in FIG. 3 are water leakage and free lime, the area detection unit 205 may detect other defect areas. For example, the area detection unit 205 may detect exfoliation, flaking, and steel-exposed areas. If any exfoliation, flaking, and steel-exposed areas are detected, the integral determination unit 206 to be described below determines the damage degree rank by also taking into account the information about such detection results.

(Integral Determination Unit)

Through the foregoing processing, the crack grid pattern map 606, the crack width estimation result 607, and the water leakage map 605 are generated as illustrated in FIG. 6. In step S507, the integral determination unit 206 determines the damage degree based on the crack grid pattern map 606, the crack width estimation result 607, and the water leakage map 605. The integral determination unit 206 determines the damage degree rank in a rule-based fashion based on the determination criteria for the damage degree rank in FIG. 3.

A specific example of the determination made of the damage degree rank by the integral determination unit 206 will be described with reference to FIG. 6. In FIG. 6, integral determination windows 645, 646, and 647 representing the same partial area of the original image (first image 601) are illustrated in the water leakage map 605, the crack grid pattern map 606, the crack width estimation result 607, respectively. The water leakage map 605, the crack grid pattern map 606, and the crack width estimation result 607 are images having the same size as that of the original image. Here, the state determination unit 204 generates the crack grid pattern map 606 by enlarging the map containing the processing results of the state determinations to the size of the original image.

The integral determination unit 206 determines the damage degree rank of the partial area by using the information in the integral determination windows 645, 646, and 647 of the respective maps, and generates a damage degree determination result 608. For example, the damage degree rank is determined based on the determination criteria for the damage degree rank in FIG. 3 in the following manner. The range of the integral determination window 645 in the water leakage map 605 does not include a water leakage area. The range of the integral determination window 646 in the crack grid pattern map 606 includes an area determined to be a "grid pattern (grid spacing: 20 cm to 50 cm)". The range of the integral determination window 647 in the crack width estimation result 607 includes a plurality of cracks. Suppose that the maximum crack width of the cracks is 0.2 mm. By comparing the information about the ranges of the respective integral determination windows 645 to 647 with the determination criteria for the damage degree rank in FIG. 3, the integral determination unit 206 determines the damage degree rank matching the condition as the damage degree rank given to the ranges of the integral determination windows 645 to 647. The damage degree rank given to the ranges of the integral determination windows 645 to 647 in FIG. 6 can thereby be determined as damage degree rank e. As a result, the damage degree determination result 608 of FIG. 6 indicates that an image range 648 is in damage degree rank e. The integral determination unit 206 performs similar processing on each portion of the original image to determine the damage degree rank of that portion of the original image. Specifically, the integral determination unit 206 determines the damage degree rank of each partial area by successively sliding the positions of the integral determination windows 645 to 647. In FIG. 6, the damage degree ranks of other partial areas, such as an image range 649, are determined by this processing. Portions including no crack are determined to be in damage degree rank a based on FIG. 3. The portions of damage degree rank a are omitted in FIG. 6.

In the foregoing description, the damage degree determination has been described to be made with respect to each partial area. However, the target range to make a damage degree determination may be the entire image. The integral determination unit 206 refers to the crack grid pattern map 606, the crack width estimation result 607, and the water leakage map 605 in FIG. 6 to collect the type of crack grid pattern (the presence or absence of a grid pattern and the grid spacing) in the entire image, the widths of the cracks, and the presence or absence of water leakage, and compares the collected information with the determination criteria for the damage degree rank. The integral determination unit 206 then determines the damage degree of the entire image. In the example of FIG. 6, the entire image has a "grid pattern (grid spacing: 20 cm to 50 cm)" with a "crack width of 0.2 mm" and "water leakage". The damage degree rank of the entire image is thus determined as damage degree rank g. Furthermore, the range to make a damage degree determination may be a part of the structure to be inspected or the entire structure. For example, in the case of determining the damage degree of the entire structure, a first image of each part of the structure is initially prepared. Specifically, a first image of each floor slab between bridge piers is prepared. Crack grid pattern maps, crack width estimation results, and water leakage maps are then generated as described above from the plurality of first images. The integral determination unit 206 determines the damage degree rank of the entire structure by collecting information about the crack widths, the presence or absence of a crack grid pattern, and the presence or absence of water leakage obtained from the plurality of first images, and comparing the collected information with the determination criteria for the damage degree rank.

In the foregoing description, the damage degree rank has been described to be determined in a rule-based fashion based on the determination criteria for the damage degree rank in FIG. 3. However, the determination criteria for the damage degree rank are not limited to those illustrated in FIG. 3, and any criteria may be used. Alternatively, a damage degree determination classifier may be trained by machine learning without setting the clear determination criteria for the damage degree rank as illustrated in FIG. 3, and the damage degree rank may be determined by using the trained damage degree determination classifier. In such a case, a large number of pairs of input data for the integral determination unit 206 and teaching data with respect to the input data are prepared as training data. A specific example will now be described. The input data for the integral determination unit 206 is information about the integral determination windows 645 to 647 in the respective maps in FIG. 6. A human operator checks the input data that is obtained from the integral determination windows 645 to 647 and is to be input to the integral determination unit 206, and determines the damage degree rank as teaching data. The damage degree determination classifier of the integral determination unit 206 is trained by using the training data including such pairs of input data and teaching data. While any method may be used as a learning algorithm, the damage degree determination classifier is desirably trained by using such an algorithm as a decision tree and a randomized tree.

(Display Control Unit)

The damage degree determination result 608 of FIG. 6 is generated through the foregoing processing. In step S508, the display control unit 207 displays the damage degree determination result 608 on the display unit 105. A display control performed by the display control unit 207 will now be described with reference to FIG. 9.

Figure 9:
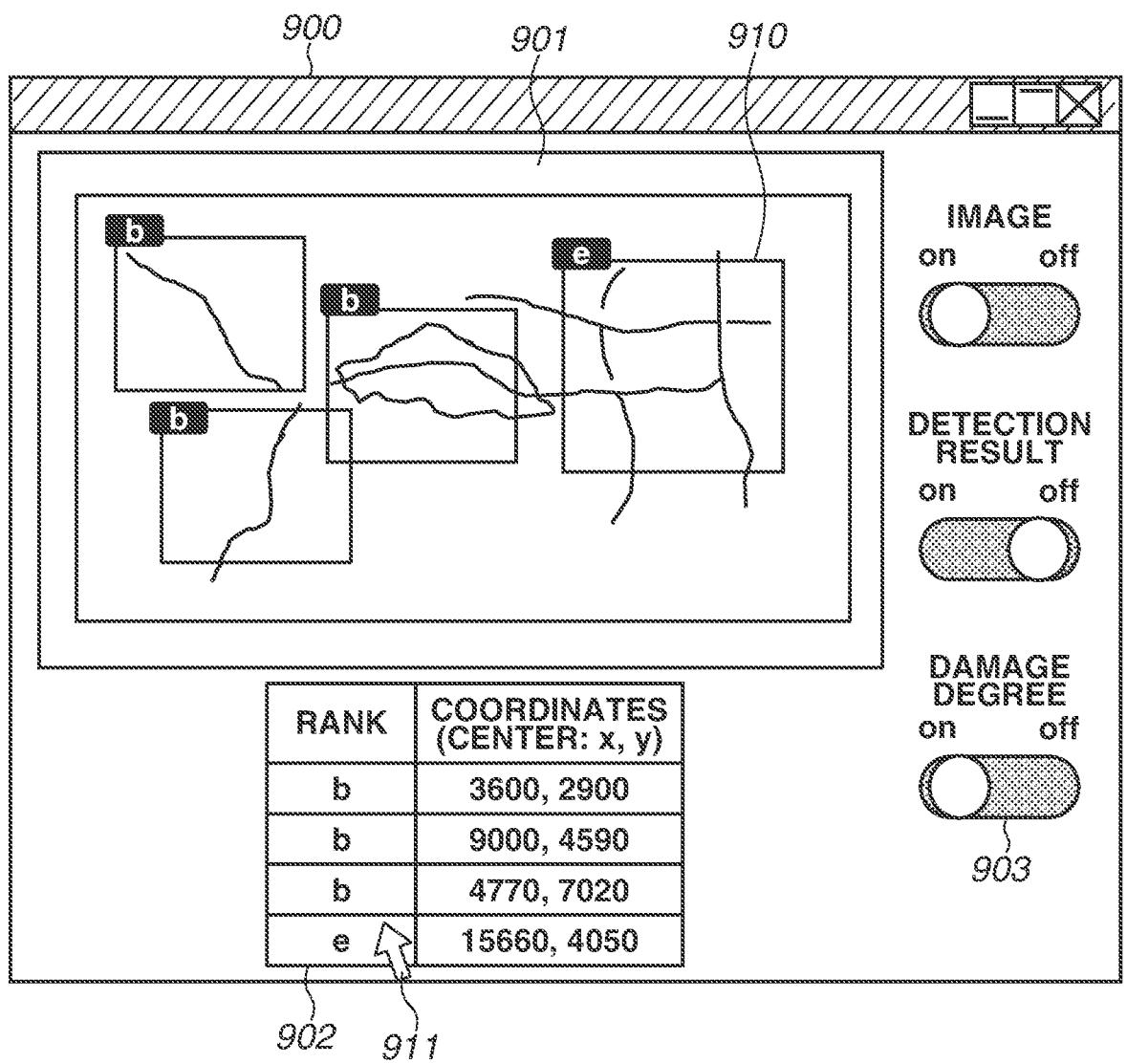
FIG. 9 is a diagram for describing display items of a display unit.

FIG. 9 illustrates an application window 900 where the display control unit 207 displays the damage degree determination result 608. The application window 900 displays an image display area 901, a damage degree rank display area 902, and toggle switches 903 for switching whether to display or hide various types of data. The image display area 901 displays the target image (first image 601) subjected to the damage degree determination, the detection results of cracks, water leakage, and free lime, and the damage degree determination result 608. The detection results of the cracks are desirably displayed along with the information about the crack width estimation result 607. To provide such a display, a method for displaying the numerical values of the crack widths beside the cracks or a method for changing the cracks in color based on the crack widths can be used. FIG. 9 illustrates a state where the first image 601 and the damage degree determination result 608 are displayed. For example, areas 910 indicating damage degree determination results and damage degree ranks are displayed. The display items of the image display area 901 can be switched by the toggle switches 903 to display or hide various items. Such a display enables the user to observe the damage degree determination result 608 in association with the first image 601 and the detection results.

The damage degree rank display area 902 lists the damage degree determination results in the image being viewed. If the user selects a damage degree determination result in the damage degree rank display area 902, the area or areas in that damage degree rank can be highlighted. For example, if the user puts a mouse cursor 911 over damage degree rank e and double-clicks, the frame surrounding the area 910 of the corresponding damage degree determination result is blinked. As another method for highlighting, the area 910 of the damage degree determination result may be enlarged. Moreover, the list display in the damage degree rank display area 902 is configured to be sortable by the damage degree rank. Such functions enable the user to observe portions of higher damage degree ranks by priority, whereby the damage degree determination result 608 can be easily observed.

If the user clicks on or hovers over a displayed damage degree determination result, the reason for the determination of the damage degree rank may be displayed. For example, if the user clicks the mouse on the area 910 of a damage degree determination result, the reason for the determination of the damage degree rank may be displayed like "four cracks, maximum crack width: 0.2 mm, grid pattern, grid spacing: 50 cm, no water leakage, no free lime". Such information may be displayed in the damage degree rank display area 902.

As described above, the information processing apparatus 100 detects cracks and estimates crack widths by local determination, determines the state of cracking by making a determination in a range wider than in making a local determination, and integrates the results to determine the damage degree rank. The information processing apparatus 100 uses a reduced image of the crack determination results for the global determination, whereby the state of cracking can be determined based on data preserving crack information.

(Modifications)

In the first exemplary embodiment described above, the information processing apparatus 100 generates the first crack map 602, and generates the second crack map 604 by the image conversion unit 203 reducing the first crack map 602 using an image enlargement and reduction algorithm. To generate the second crack map 604, the image conversion unit 203 can use another method without use of the image enlargement and reduction algorithm. In this method, the image conversion unit 203 initially converts the results of the crack detection processing included in the first crack map 602 detected from the first image 601 into vector data, and generates the second crack map 604 by using the vector data. In the foregoing first exemplary embodiment, the crack detection results obtained from the first image 601 have been subjected to the line thinning processing. The image conversion unit 203 here further converts the line-thinned cracks into vector data. The vector data on the cracks is data where the coordinates of a plurality of line segments representing crack positions are expressed in the image coordinate system of the first image 601. In generating the second crack map 604, the image conversion unit 203 initially transforms the coordinates of the vector data into the coordinate system of the second crack map 604. The image conversion unit 203 then draws line segments representing cracks on the second crack map 604 by using the coordinate-transformed vector data. A case where the image conversion unit 203 generates a second crack map in which crack pixels are expressed in black (0) and pixels other than the crack pixels in white (255), as in the second crack map 604 of FIG. 6, will be described as an example. In such a case, the image conversion unit 203 initially prepares an image that has the same size as that of the second crack map and where all pixels are in white (255). The image conversion unit 203 draws line segments on the image based on the information about the vector data so that crack pixels are in black (0). The image conversion unit 203 can thereby generate the second crack map while preventing the line segments representing the crack determination results from getting thinner or disappearing due to the effect of the image enlargement and reduction algorithm.

In the first exemplary embodiment, the state determination unit 204 is described to determine the state of cracking by using two images, namely, the second local determination map (second crack map) 604 and the second image (low resolution image) 603. The state determination unit 204 can thus determine the state of cracking based on the crack determination results and image features. As a modification, the state determination unit 204 may make a state determination by using only the second local determination map 604. In determining the state of cracking from only the second local determination map 604, the data to be input to the neural network 803 of FIG. 8 is only the partial maps obtained from the second crack map 604. The state determination unit 204 can thereby determine the state of cracking from only the second local determination map 604, thus simplifying processing. If the state of cracking is thus determined by using only the second local determination map 604, the reduction processing for generating the second image 603 can be omitted.

In the first exemplary embodiment, the image conversion unit 203 generates reduced images in a 50% resolution, such as the second image 603 and the second crack map 604 in FIG. 6. However, instead of the reduced images in a single resolution in the first exemplary embodiment, the image conversion unit 203 may generate a plurality of reduced images in a plurality of different reduction resolutions. Specifically, the image conversion unit 203 initially reduces the first image 601 at a plurality of different reduction ratios to generate a plurality of second images. The image conversion unit 203 also reduces the first crack map 602 at the same plurality of reduction ratios to generate a plurality of second crack maps. The state determination unit 204 then determines the state of cracking by using the second images and the second crack maps in the respective reduced sizes. As a result, crack grid pattern maps (state maps) in the respective different reduced sizes are generated. The state determination unit 204 integrates the crack grid pattern maps to generate a final crack grid pattern map to be output. The resulting crack grip pattern map indicates the positions of grid patterns of cracks determined in multiple resolutions. The integral determination unit 206 then performs integral determination processing by using the crack grip pattern map, the crack width estimation result 607, and the water leakage map (defect area map) 605. The integral determination processing can be performed in a manner similar to that in the first exemplary embodiment.

A second exemplary embodiment of the present invention will be described below. In the first exemplary embodiment, the state determination unit 204 is described to determine the state of cracking (that cracks are in a grid pattern). The state to be determined by the state determination unit 204 is not limited thereto. In the second exemplary embodiment, an example where the state to be determined by the state determination unit is the damage degree will be described.

The second exemplary embodiment will initially be overviewed. In the first exemplary embodiment, the integral determination unit 206 determines the damage degree rank, and for that purpose the state determination unit 204 determines that cracks are in a grid pattern as intermediate information. By contrast, in the second exemplary embodiment, a state determination unit 1004 directly determines the damage degree from an image and crack detection results without explicitly determining the state of cracking. The state determination unit 1004 can thereby determine the damage degree by directly using image features and detailed information such as the occurring positions and the number of cracks.

(Configuration)

Figure 10:
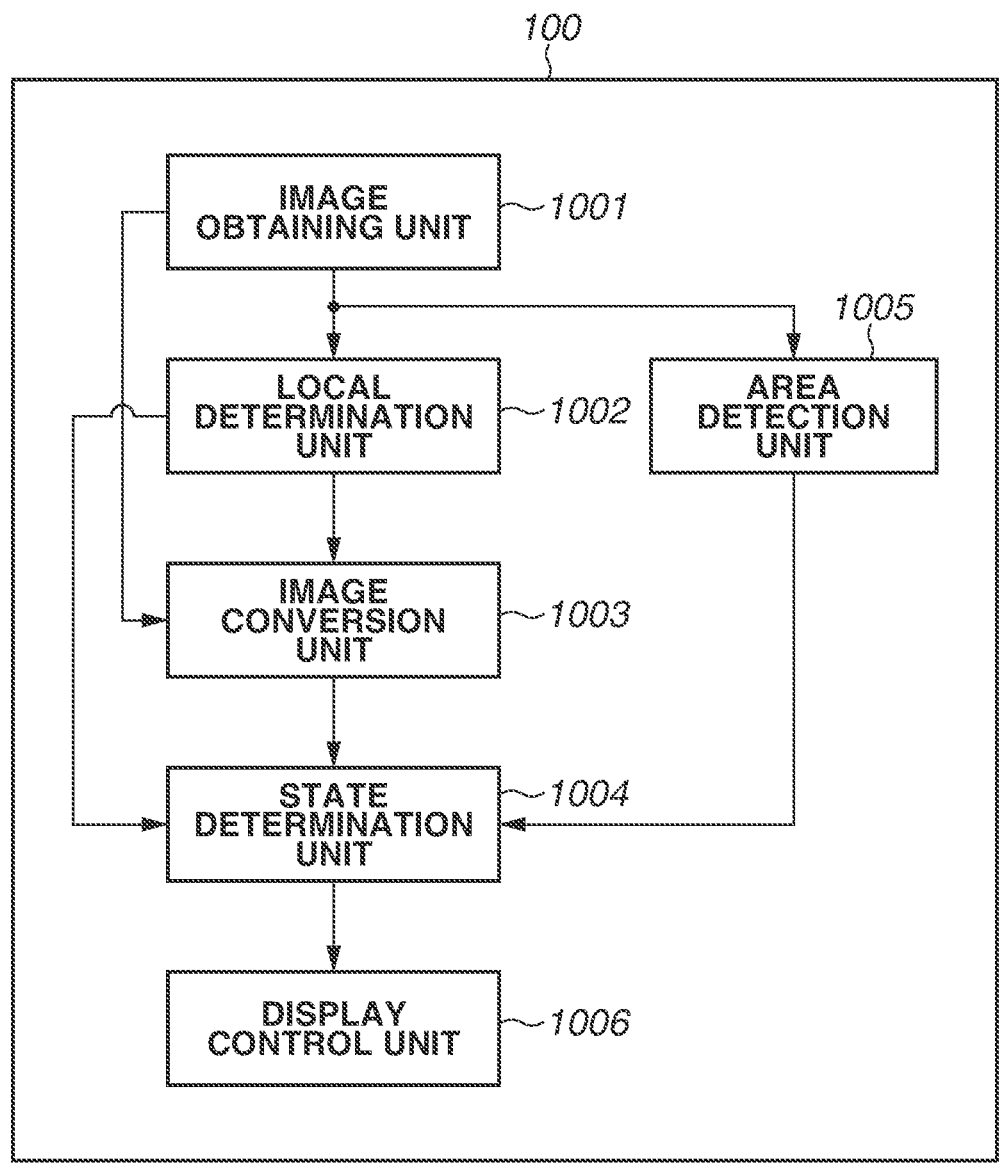
FIG. 10 is a block diagram illustrating a functional configuration example of an information processing apparatus.

FIG. 10 is a block diagram illustrating a functional configuration example of an information processing apparatus 100 according to the second exemplary embodiment. The information processing apparatus 100 includes an image obtaining unit 1001, a local determination unit 1002, an image conversion unit 1003, the state determination unit 1004, an area detection unit 1005, and a display control unit 1006. In the second exemplary embodiment, since the state determination unit 1004 outputs the damage degree, the integral determination unit 206 according to the first exemplary embodiment is not needed. Unlike the block diagram (FIG. 2) of the first exemplary embodiment, the block diagram of FIG. 10 therefore does not include the integral determination unit 206. The functional units are implemented by a CPU 101 loading programs stored in a ROM 102 into a RAM 103 and executing the programs to perform processing based on a flowchart to be described below. The CPU 101 stores the execution results of respective processes into the RAM 103 or an HDD 104. If, for example, hardware is configured as an alternative to the software processing using the CPU 101, arithmetic units and circuits corresponding to the processing of the respective functional units described here can be configured.

(Processing)

Figure 11:
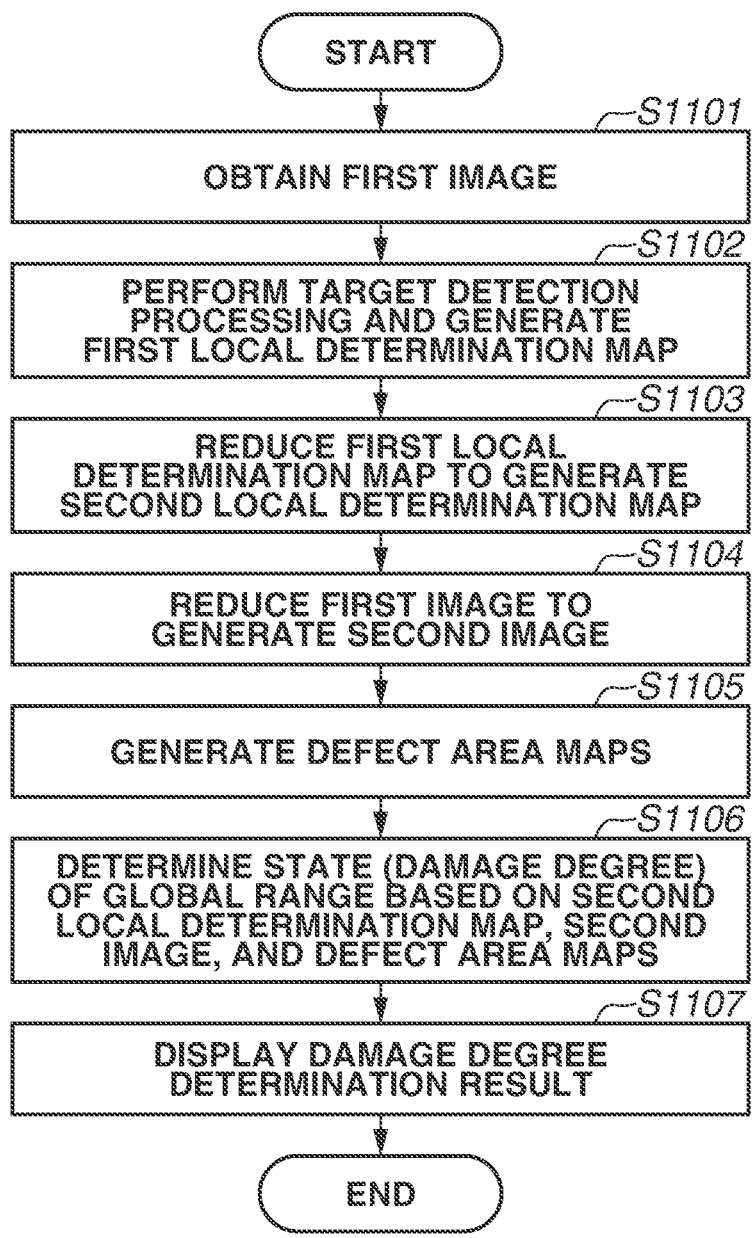
FIG. 11 is a flowchart illustrating an information processing method.
Figure 12:
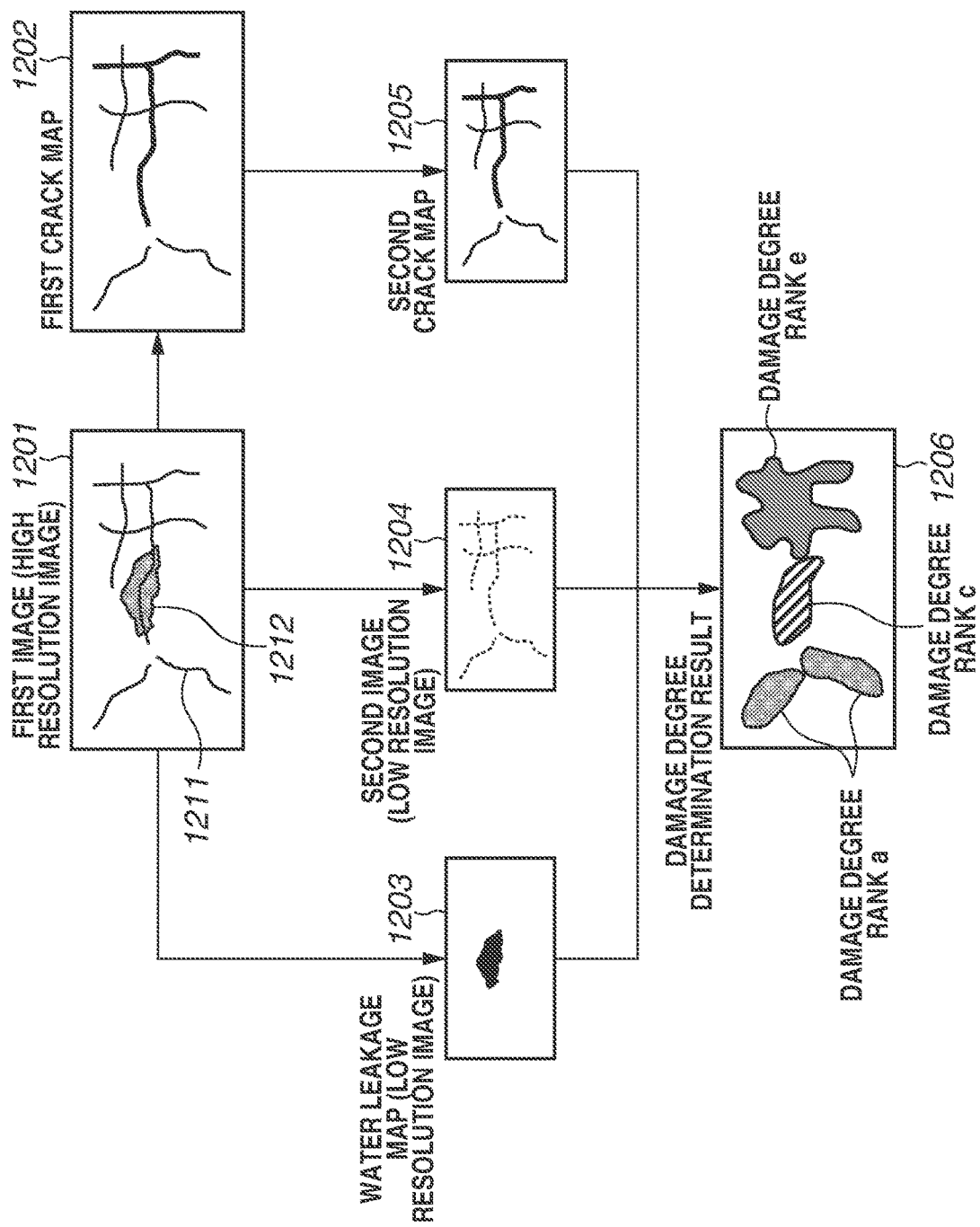
FIG. 12 is a diagram for describing processing of the information processing apparatus.

FIG. 11 is a flowchart illustrating an information processing method of the information processing apparatus 100 according to the second exemplary embodiment. FIG. 12 illustrates a specific case example of the processing from the input of an image to the determination of the damage degree according to the second exemplary embodiment.

In step S1101, the image obtaining unit 1001 initially obtains an image to determine the damage degree. In the second exemplary embodiment, the determination target image is a high resolution image as described in conjunction with FIG. 4A as in the first exemplary embodiment. This high resolution image will hereinafter be referred to as a first image. FIG. 12 illustrates a first image 1201 as an image to be subjected to the processing described below. The first image 1201 includes cracks 1211 and water leakage 1212.

(Local Determination Unit)

In step S1102, the local determination unit 1002 makes a local determination on the first image 1201. As in the first exemplary embodiment, the local determination unit 1002 detects cracks and estimates crack widths based on detailed image information using the first image (high resolution image), and generates a first crack map containing information about the crack widths as a first local determination result. The cracks can be detected, and the crack widths can be estimated through processing similar to that of the first exemplary embodiment.

The second exemplary embodiment is different from the first exemplary embodiment in that the local determination unit 1002 determines the attributes of the detection processing results and adds the attributes of the detection processing results to the first crack map. Specifically, the local determination unit 1002 adds information (attributes) about the crack widths to the first crack map. The purpose is for the state determination unit 1004 to be described below to determine the damage degree by using the information about the cracks and the crack widths. In FIG. 12, a first crack map 1202 to which crack width information is added is illustrated as the output of the local determination unit 1002. The first crack map 1202 is data similar to the crack width estimation result 607 according to the first exemplary embodiment. Specifically, the first crack map 1202 is a map where the values of the crack widths of cracks are stored in pixels representing the cracks.

(Image Conversion Unit)

In steps S1103 and S1104, the image conversion unit 1003 reduces the first local determination map (first crack map) 1202 and the first image 1201. In step S1104, the reduction processing on the first image 1201 can be performed by a method similar to that of the first exemplary embodiment.

In step S1103, the image conversion unit 1003 desirably uses a processing method described in the first exemplary embodiment other than the common image enlargement and reduction algorithms such as bilinear interpolation and nearest neighbor interpolation. For a specific description, suppose that the values of the crack widths of cracks are stored in the pixels located at the crack positions in the first crack map 1202. If such a map is subjected to interpolation processing using an algorithm such as bilinear interpolation and nearest neighbor interpolation, the values of the crack widths in the pixels of the reduced second crack map can be changed and the crack width information can be erroneous.

In the second exemplary embodiment, in the processing for reducing the first crack map 1202 including the crack width information, the image conversion unit 1003 therefore generates the second crack map by using, for example, the method for duplicating representative values in respective filter ranges, described in conjunction with FIG. 7B. Specifically, for example, in performing reduction processing to a 50% size, the image conversion unit 1003 uses the maximum value of the crack widths in a 2×2-pixel filter range as the value of the corresponding pixel in the reduced image. This is similar to max pooling processing. The image conversion unit 1003 can thereby generate the reduced second crack map while properly preserving the information about the crack widths, or information about large crack widths in particular.

Another method for reducing the first crack map 1202 to which the crack width information is added is the method for performing reduction processing via vector data, described as a modification of the first exemplary embodiment. In such a case, the image conversion unit 1003 initially generates vector data expressing the line segments of the cracks based on the crack detection results, and associates the vector data on the line segments with information about the crack widths of the respective portions. The image conversion unit 1003 then draws line segments representing the crack positions over the reduced image based on the information about the vector data. In so doing, the image conversion unit 1003 draws the line segments by using the values of the crack widths associated with the line segments. This method also enables generation of the second crack map containing the correct values of the crack widths in the respective pixels.

In such a manner, the image conversion unit 1003 generates a second image 1204 and a second crack map 1205 in FIG. 12.

(Area Detection Unit)

In step S1105, the area detection unit 1005 detects defect areas such as water leakage and free lime in the first image 1201, and generates defect area maps. This area detection processing can be performed by a method similar to that of the first exemplary embodiment. As in the first exemplary embodiment, the area detection unit 1005 may detect defect areas from the first image 1201 and the second image 1204, or detect defect areas by using either one of the images.

In the second exemplary embodiment, the defect area maps generated by the area detection unit 1005 have the same size as that of the second image 1204 and the second crack map 1205. The area detection unit 1005 may reduce defect area maps having the same size as that of the first image 1201 to the size of the second image 1204 by using the image conversion unit 1003.

FIG. 12 illustrates a water leakage map 1203 output from the area detection unit 1005. The water leakage map 1203 is a defect area map having the same size as that of the second image 1204 and the second crack map 1205. The area detection unit 1005 may output not only the water leakage map 1203 but also other defect area maps such as a free lime map. In the subsequent processing, the other defect area maps can be used similarly to the water leakage map. Descriptions of the other defect area maps will thus be omitted below.

(State Determination Unit)

In step S1106, the state determination unit 1004 determines the state of a global range based on the second local determination map 1205, the second image 1204, and the defect area maps (water leakage map 1203). The state determination unit 1004 determines the damage degree rank of a global range as the state of the global range. FIG. 12 illustrates a state where the state determination unit 1004 generates a damage degree determination result 1206 from the water leakage map 1203, the second image 1204, and the second crack map 1205. While in the second exemplary embodiment the state determination unit 1004 does not output the state of cracking as intermediate information, the damage degree can be determined with the grid pattern of cracks taken into account by determining the damage degree in a global range, using the second crack map 1205 as an input.

In the present exemplary embodiment, as will be described below, a damage degree determination classifier is generated by machine learning. The state determination unit 1004 can determine the damage degree based on various types of information, such as the number of cracks, the density of cracks, and the state of the first image 1201 (the texture of the concrete wall surface), by determining the damage degree using the classifier. This enables the determination of the damage degree according to more complicated criteria than by a rule-based determination.

Figure 13:
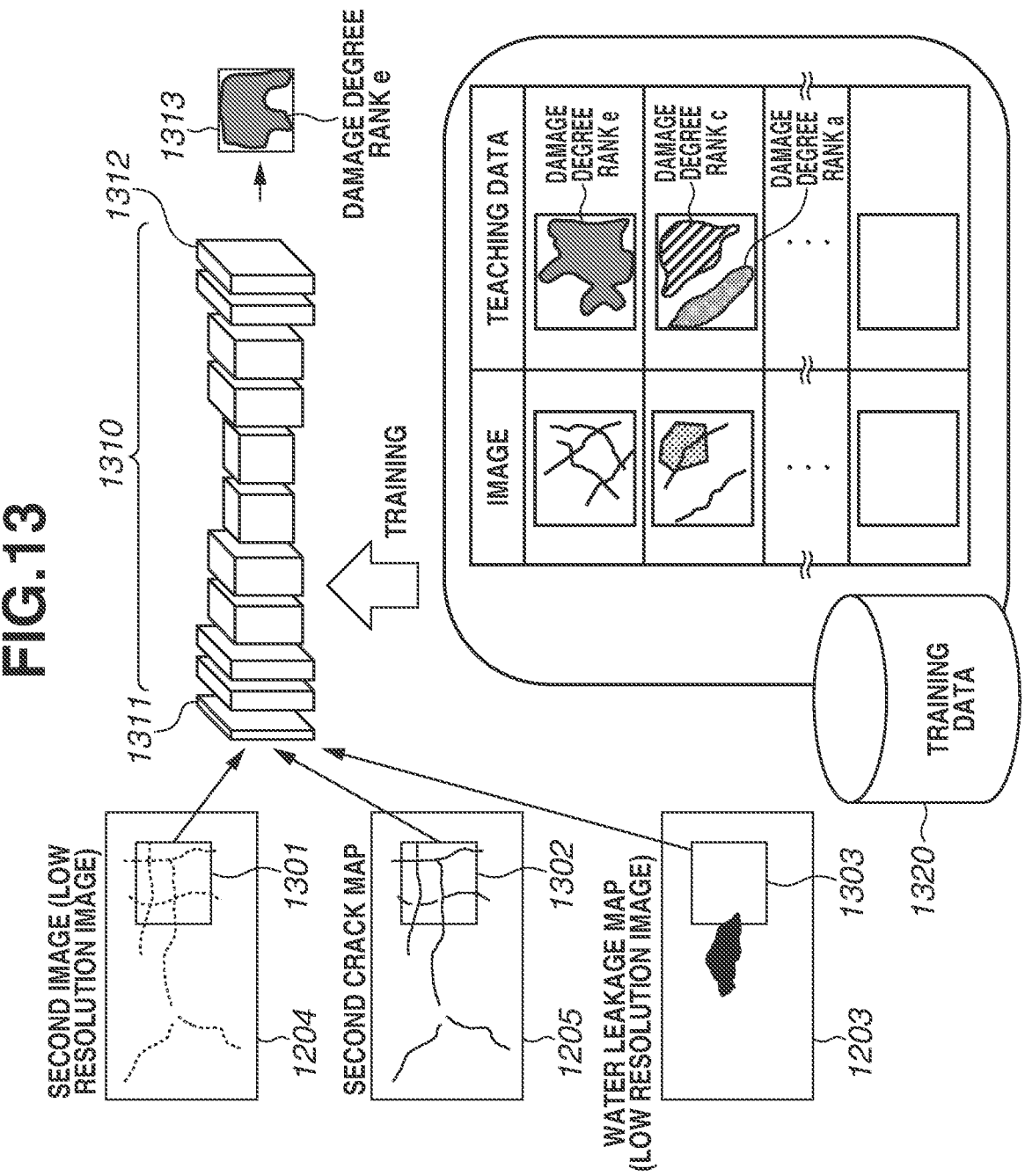
FIG. 13 is a diagram for describing a state determination unit.

FIG. 13 is a diagram illustrating the determination of the damage degree by inputting the second image 1204, the second crack map 1205, and the water leakage map 1203 into the classifier of the state determination unit 1004. In the example of FIG. 13, the classifier is a neural network 1310. In FIG. 13, information in the ranges of state determination windows 1301, 1302, and 1303 in the second image 1204, the second crack map 1205, and the water leakage map 1203 is input to an input layer 1311 of the neural network 1310. Here, the partial image in the state determination window 1301 of the second image 1204 is an RGB three-channel image. The second crack map 1205 is a gray scale image where the values of crack widths are stored at the crack positions. The water leakage map 1203 is a binary image where water leakage positions and the other portions are expressed by 0 and 255, respectively. Since the second crack map 1205 and the water leakage map 1203 are one-channel images, the partial maps in the state determination windows 1302 and 1303 are also one-channel images. In inputting such a partial image and partial maps into the neural network 1310, the partial image and partial maps are integrated into a five-channel image, which is input to an input layer 1311. Note that the method for inputting the partial image and partial maps into the neural network 1310 is not limited thereto. A neural network architecture for inputting the images into respective different input layers of the neural network may be employed.

In response to such an input, the neural network 1310 outputs a damage degree determination result 1313 from its output layer 1312. In the present exemplary embodiment, the damage degree determination result 1313 is output as a damage degree map where the damage degree rank is stored in each pixel corresponding to the input images in the ranges of the state determination windows 1301 to 1303. The hatched portion of the damage degree determination result 1313 in FIG. 13 indicates an image area determined to be in damage degree rank e.

The classifier of the state determination unit 1004 thus outputs a damage degree map as the damage degree determination result 1313. For example, such a classifier can be trained in the following manner. FIG. 13 illustrates training data 1320 for training the neural network 1310. The training data 1320 includes a large number of pairs of images and teaching data. As in the data to be input to the neural network 1310, the images in the training data 1320 are five-channel images each including an image, a crack map, and a water leakage map. Each image is provided with teaching data where the damage degree rank of each pixel of the image is recorded. The teaching data is generated by a human operator observing the image, determining the damage degree rank area by area, and recording the damage degree rank. Teaching data including a plurality of damage degree ranks may be generated for one image. The training data 1320 is illustrated to include a piece of teaching data including damage degree ranks a and c. The human operator may determine the damage degree rank with reference to determination criteria for the damage degree rank such as those illustrated in FIG. 3. An inspection expert may intuitively determine the damage degree rank. In either case, a classifier for making a statistically appropriate damage degree determination can be trained with the generated training data 1320.

The classifier of the state determination unit 1004 is trained by using the training data 1320 prepared as described above. The classifier for outputting the damage degree rank as a map can be trained by a semantic segmentation algorithm using the training data 1320. The neural network 1310 illustrated in FIG. 13 is an example of the algorithm used for semantic segmentation, and the classifier of the state determination unit 1004 may use other algorithms. The training of the neural network 1310 by using the training data 1320 can be performed in the following manner. An image of the training data 1320 is initially input into the neural network 1310 to generate a damage degree map that is the output result. The damage degree map is compared with the teaching data, and the weight coefficients of the neural network 1310 are modified to reduce errors. The neural network 1310 is trained by repeating such processing while changing the input image of the training data 1320. The neural network 1310 trained thus can output a damage degree map with respect to input data.

In such a manner, the state determination unit 1004 generates a damage degree map where the damage degree rank is stored in each pixel for a range wider than that of a local determination made by the local determination unit 1002. The state determination unit 1004 slides the state determination windows 1301 to 1303 and outputs a damage degree map for each partial area, and integrates the damage degree maps of the respective partial areas to generate a damage degree map of the entire image, i.e., a damage degree determination result.

(Display Control Unit)

Through the foregoing processing, the damage degree determination result 1206 illustrated in FIG. 12 is generated. In step S1107, the display control unit 1006 displays the damage degree determination result 1206 on a display unit 105. In the first exemplary embodiment, the determination results of the damage degree ranks are described to be displayed by rectangular areas. In the second exemplary embodiment, like the damage degree determination result 1206, the ranges of the damage degree ranges are displayed in various shapes. In other respects than the shape of the range display of the damage degree determination result 1206, the processing of the display control unit 1006 can be performed in a manner similar to that of the display control unit 207 according to the first exemplary embodiment. A description thereof will thus be omitted.

As described above, in the second exemplary embodiment, the state determination unit 1004 generates the damage degree determination result 1206 from the second image 1204, the second crack map 1205, and the water leakage map 1203. The information to be used by the classifier of the state determination unit 1004 is not limited thereto, and the damage degree may be determined by taking into account other information as well. For example, the damage degree may be determined by adding information such as the number of years of use, place, members, and construction method of the structure to determine the damage degree of the information input to the classifier. This enables the determination of the damage degree by taking into information such as that frost damage is likely to occur if the structure is located in a cold region, and that salt damage is likely to occur in a coastal region.

A third exemplary embodiment of the present invention will be described below. In the foregoing exemplary embodiments, the result of the crack detection processing by the local determination unit is described to be used as the first crack map. However, the information to be used as the first crack map is not limited thereto, and intermediate information of the crack detection processing may be used instead. In the third exemplary embodiment, an example where the intermediate information of the crack detection processing is used as the first crack map will be described. The hardware configuration and functional configuration according to the third exemplary embodiment are similar to those of the first exemplary embodiment. A description thereof will thus be omitted.

Figure 14:
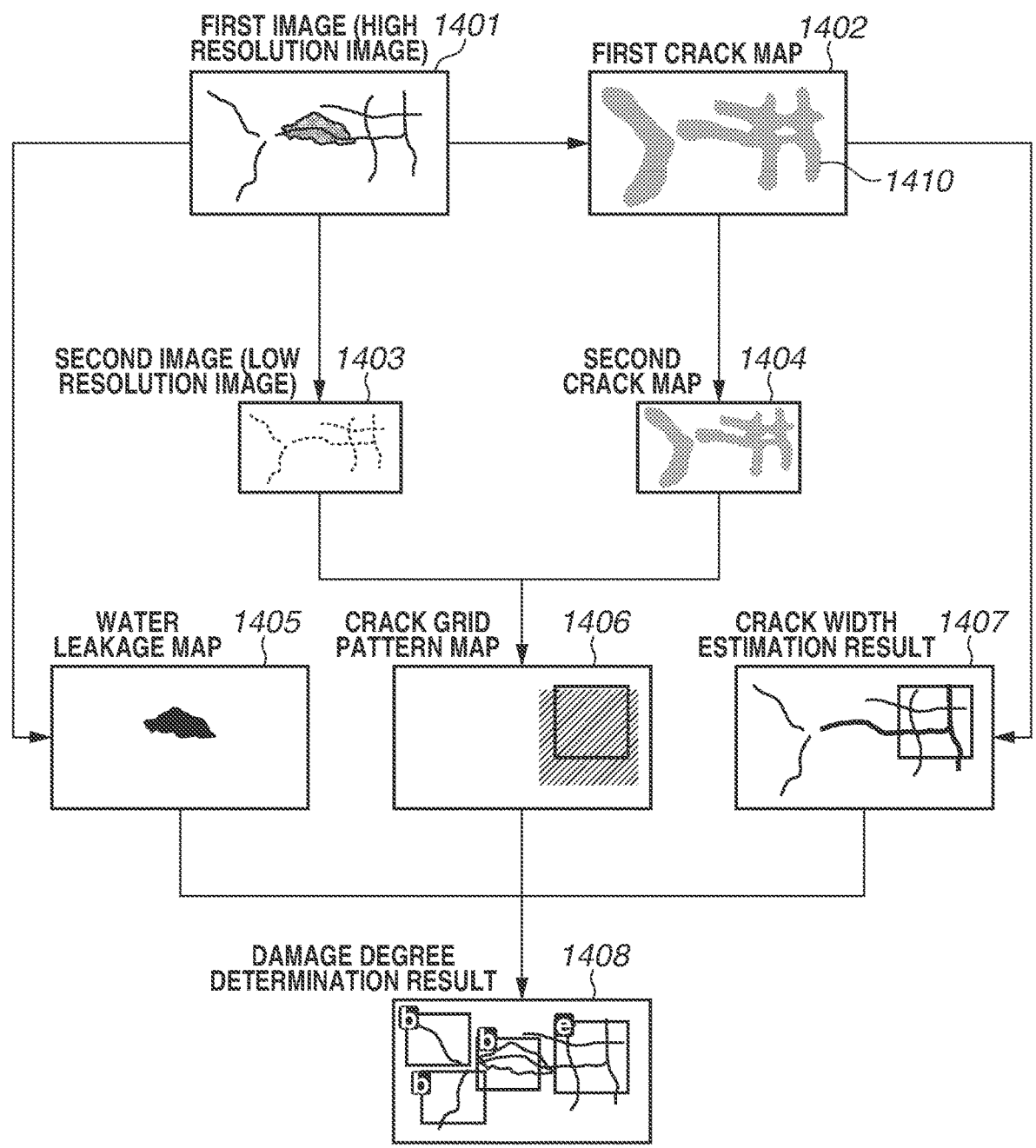
FIG. 14 is a diagram for describing processing of an information processing apparatus.

FIG. 14 illustrates a specific case example of the processing from the input of an image to the determination of the damage degree according to the third exemplary embodiment. In the third exemplary embodiment, the local determination unit 202 initially performs the crack detection processing based on a first image 1401. In the first exemplary embodiment, the local determination unit 202 generates, as the result of the crack detection processing, the first crack map 602 by applying the threshold processing and the line thinning to a score map. In the third exemplary embodiment, the local determination unit 202 generates, as intermediate information of the crack detection processing, a first crack map by using a score map. FIG. 14 illustrates a state where the local determination unit 202 generates a first crack map 1402 from the first image 1401. The first crack map 1402 is a score map of the intermediate information of the crack detection processing, i.e., a map where scores indicating the likelihood of being a crack are stored in the respective pixels. In FIG. 14, hatched portions 1410 represent pixels where the scores indicating the likelihood of being a crack are stored.

In the third exemplary embodiment, the subsequent processing can be performed in a similar manner to that of the first exemplary embodiment. For example, the image conversion unit 203 generates a second crack map 1404 by reducing the first crack map 1402. The image conversion unit 203 generates a second image 1403 by reducing the first image 1401. The state determination unit 204 determines the state of cracking by using the second image 1403 and the second crack map 1404, and generates a crack grid pattern map 1406. The local determination unit 202 generates a crack width estimation result 1407 from the first image 1401. The area detection unit 205 generates a water leakage map 1405 from the first image 1401. The integral determination unit 206 generates a damage degree determination result 1408 based on the water leakage map 1405, the crack grid pattern map 1406, and the crack width estimation result 1407. The display control unit 207 displays the damage degree determination result 1408 on the display unit 105.

As described above, using the intermediate information of the crack detection processing, the information processing apparatus 100 can determine the state of cracking by also taking into account information that disappears due to the threshold processing in the crack detection processing.

In the third exemplary embodiment, a score map is described to be used as the intermediate information. However, the intermediate information used in the third exemplary embodiment is not limited thereto. For example, if the crack detection processing is implemented by a convolutional neural network (CNN), information about an intermediate layer of the CNN may be used as the first crack map 1402. The CNN intermediate layer to be used for the first crack map 1402 may be any one of the intermediate layers of the CNN. A different plurality of intermediate layers may be extracted from the CNN, and a CNN map formed by combining the extracted intermediate layers may be used as the first crack map 1402.

In the third exemplary embodiment, as in the first exemplary embodiment, the state determination unit 204 is described to determine the state of cracking. However, the state determination unit 204 may directly determine the damage degree as in the second exemplary embodiment.

A fourth exemplary embodiment of the present invention will be described. In the third exemplary embodiment, the intermediate information of the crack detection processing is described to be used for the first crack map 1402. In the fourth exemplary embodiment, another example of the information to be used for the first crack map will be described. The fourth exemplary embodiment describes a case where the user observes and corrects the crack detection result, and the corrected crack detection result is used as the first crack map. The hardware configuration and functional configuration of the fourth exemplary embodiment are similar to those of the first exemplary embodiment. A description will thus be omitted.

Figure 15:
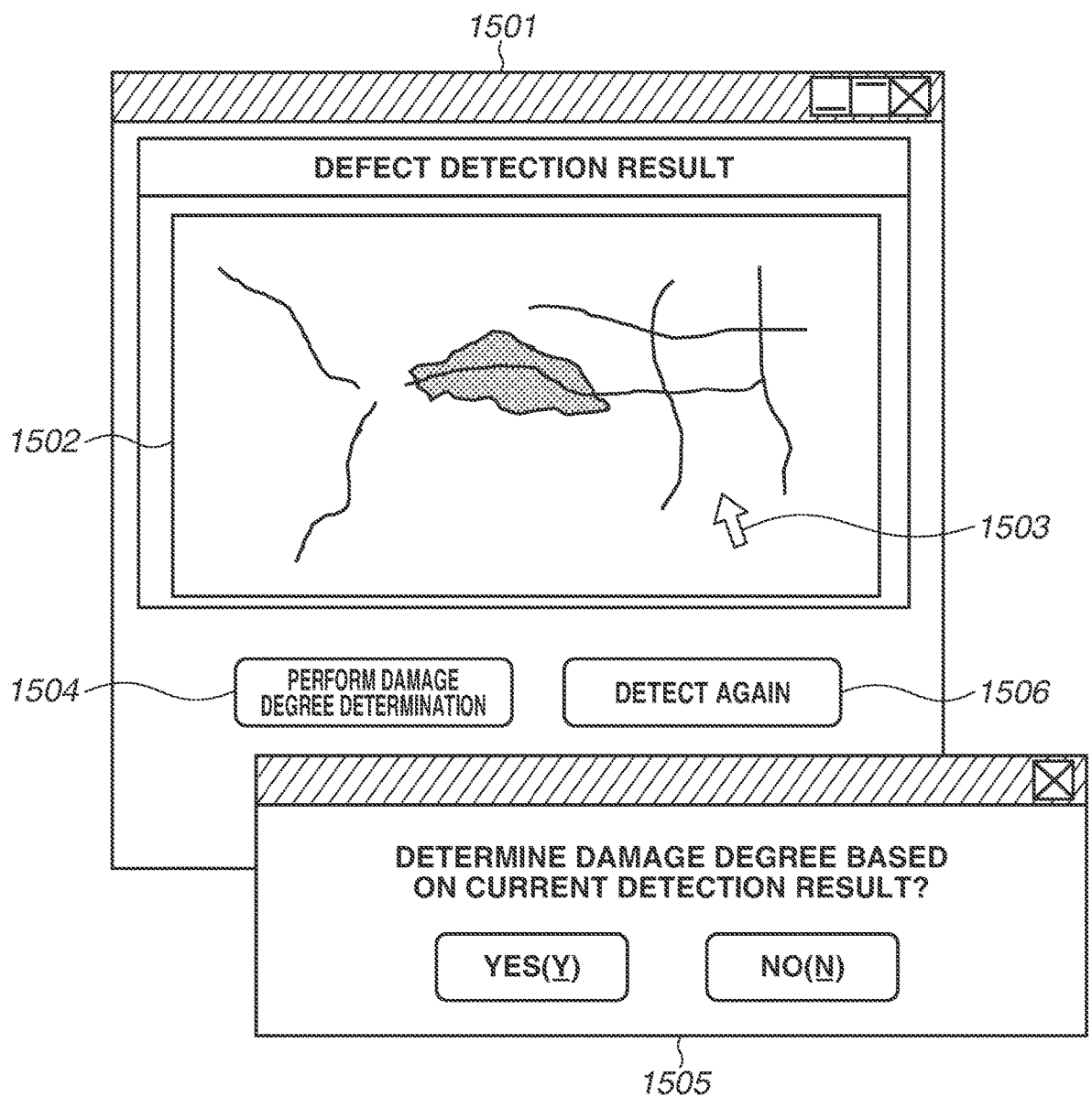
FIG. 15 is a diagram for describing display items of a display unit.

In the fourth exemplary embodiment, after the local determination unit 202 completes the crack detection processing, the display control unit 207 displays the result of the crack detection processing by the local determination unit 202 on the display unit 105. FIG. 15 illustrates a user interface for displaying the crack detection result. FIG. 15 illustrates an application window 1501 that displays the crack detection result. The application window 1501 includes a detection result display area 1502, and the crack detection result is displayed in the detection result display area 1502. In the example of FIG. 15, a water leakage detection result detected by the area detection unit 205 is displayed in addition to the crack detection result. The detection results are superimposed on the original image so that the original image can be compared with the detection results.

The user interface (UI) illustrated in FIG. 15 also includes a UI for correcting the detection results. This enables the user to correct an undetected or erroneously-detected crack included in the result of the crack determination processing if any. For example, the user can correct the crack detection result, such as addition and deletion of a crack, by operating a mouse cursor 1503 via the operation unit 106.

After the crack correction processing is completed, the user clicks on a "perform damage degree determination" button 1504. FIG. 15 illustrates a state where a confirmation dialog box 1505 is displayed after the "perform damage degree determination" button 1504 is clicked. If the user selects "yes" in the dialog box 1505, the local determination unit 202 corrects the result of the crack detection processing based on the user's operation, and generates a first crack map. Using this first crack map, the damage degree can subsequently be determined by processing similar to that of the first or second exemplary embodiment.

According to the fourth exemplary embodiment described above, if the result of the crack detection processing includes an error, the information processing apparatus 100 can correct the result and determine the damage degree.

If the result of the crack detection processing is insufficient and does not reach a correct-and-use level, the crack detection processing may be performed again after the parameters of the crack detection processing are changed. For example, the application window 1501 of FIG. 15 includes a redetection button 1506. If the user determines that the crack detection result is insufficient, the user can click on the redetection button 1506, change conditions such as the parameters of the crack detection processing, and input a command to perform detection again. In such a case, the local determination unit 202 performs detection again based on the accepted parameters and other conditions.

A fifth exemplary embodiment of the present invention will be described below. In the foregoing exemplary embodiments, the image conversion unit is described to reduce the first image and the first local determination map, and the state determination unit is to make a state determination. The fifth exemplary embodiment describes an example where a local determination and a global determination are made without reducing the first image or the first local determination map. The hardware configuration and functional configuration according to the fifth exemplary embodiment are almost the same as those of the first exemplary embodiment. Descriptions thereof will thus be omitted. The fifth exemplary embodiment differs in the functional configuration in that the image conversion unit 203 according to the first exemplary embodiment is not needed.

In the fifth exemplary embodiment, as in the foregoing exemplary embodiments, the local determination unit 202 initially detects cracks from information in local ranges of a first image, and generate a first crack map. Through this detection processing, for example, cracks are detected from information in the range of the detection window 403.

Next, the state determination unit 204 determines the state of cracking. In the fifth exemplary embodiment, the image conversion unit 203 does not perform the processing for reducing the first crack map. The state determination unit 204 directly determines the state of cracking from the first crack map. The state determination window here represents a range wider than the detection window 403 of the crack detection processing. The state determination unit 204 can thus determine the state of cracking in a range wider than in the local determination processing, and can determine the state of configuration of cracking including a plurality of cracks. As in the method described in the first exemplary embodiment, the method for determining the state of cracking by the state determination unit 204 can be implemented by training a classifier. In such a case, the partial map of the crack map to be input to the classifier in the present exemplary embodiment is one obtained from the first crack map.

A sixth exemplary embodiment of the present invention will be described below. The foregoing exemplary embodiments have dealt with the damage degree determination in inspecting a concrete wall surface of a piece of infrastructure. The application is not limited thereto, and the exemplary embodiments may be used for other purposes. In the sixth exemplary embodiment, an apparatus (visual inspection apparatus) for capturing an image of a product in a plant and detecting defects such as a flaw will be described. The hardware configuration and functional configuration according to the sixth exemplary embodiment are similar to those of the first or second exemplary embodiment. Descriptions thereof will thus be omitted.

Figure 16:
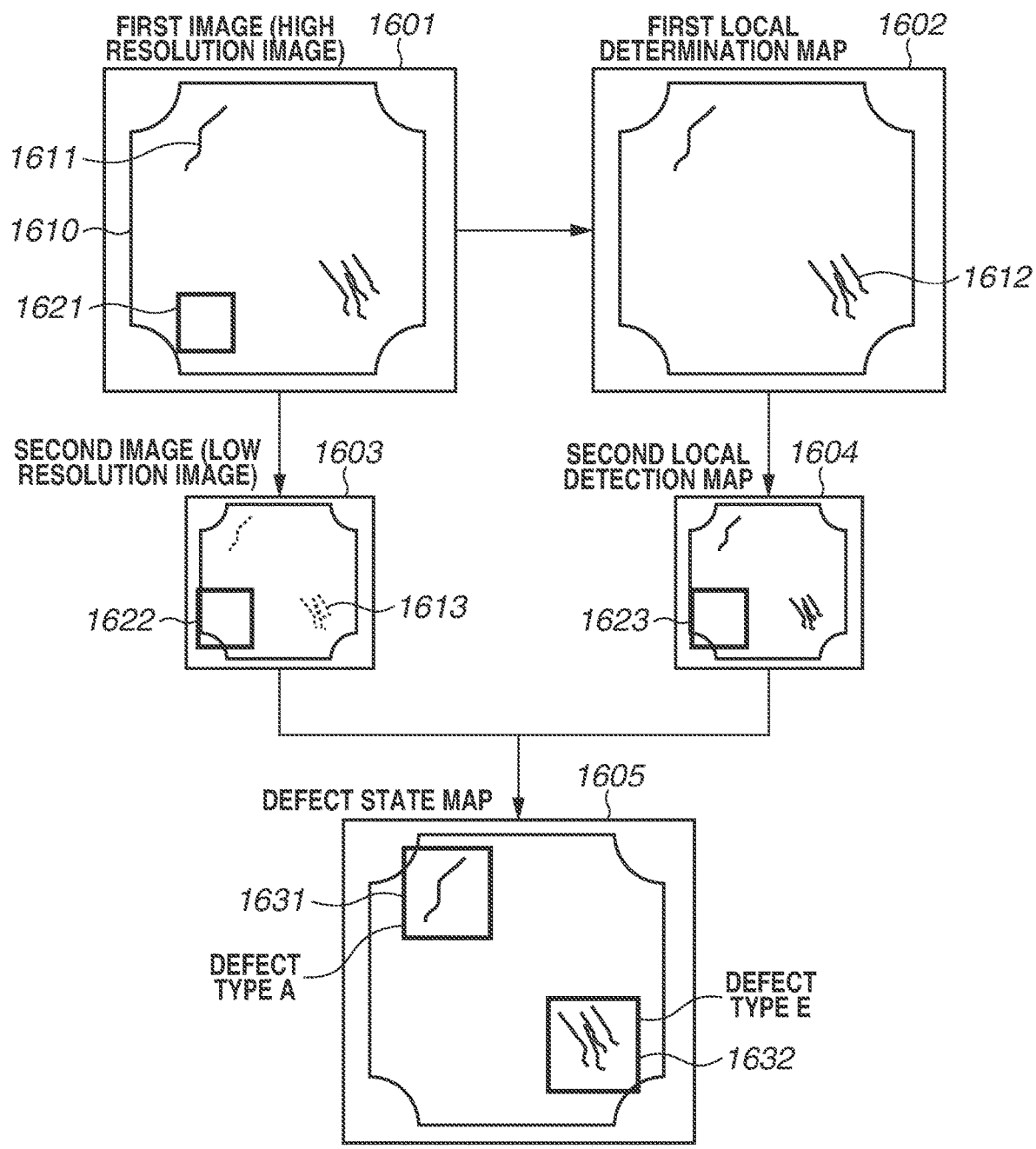
FIG. 16 is a diagram for describing processing by an information processing apparatus.

FIG. 16 illustrates a specific case example of the processing from the input of an image to the determination of the damage degree according to the present exemplary embodiment. The image obtaining unit 201 initially obtains a first image 1601 to be inspected. The first image 1601 is an image captured of an inspection target product 1601 in high resolution so that even small flaws can be detected. For example, the product 1610 in the first image 1601 has flaws 1611. While the detection targets in the following description are flaws, the defects to be detected are not limited to flaws and may include uneven portions, stains, and foreign objects.

In the present exemplary embodiment, the information processing apparatus 100 detects such flaws in a product and determines defect types from the state of the flaws. For example, a single flaw is defined as defect type A, and a plurality of flaws occurring in the same direction is defined as defect type E. Such defect types are examples for explanatory purposes, and the definitions of defect types may include other definitions. In visual inspection, the determination result of such defect types can be used for a conforming/non-conforming product determination. Depending on the defect types, the cause of occurrence of the defect in the product can also be determined.

In detecting flaws and determining the state of flaws, a high resolution image is desirably used to detect the flaws since the flaws can be very thin. By contrast, the state of flaws is desirably determined based on the state of occurrence of flaws in a somewhat wide range. In the present exemplary embodiment, as in the first exemplary embodiment, the information processing apparatus 100 therefore detects flaws by using a high resolution image, and determines the state of flaws by using a reduced image into which the high resolution image is reduced.

FIG. 16 illustrates a state where the local determination unit 202 generates a first local determination map 1602 from the first image 1601 (high resolution image). A flaw detection window 1621 of the local determination unit 202 is illustrated in the first image 1601. The first local determination map 1602 indicates flaw detection results 1612.

The image conversion unit 203 performs reduction processing on the first image 1601 and the first local determination map 1602 to generate a second image (low resolution image) 1603 and a second local determination map 1604. Flaws 1613 in the second image 1603 are illustrated in dotted lines, which indicates that the flaws are difficult to identify because of the reduction processing of the first image 1601. By contrast, the second local determination map 1604 is a map preserving the information on the flaws since the first local determination map 1602 is reduced into the second local determination map 1604.

The state determination unit 204 determines the state of flaws based on the second image 1603 and the second local determination map 1604. State determination windows 1622 and 1623 of the state determination unit 204 are illustrated in the second image 1603 and the second local determination map 1604. With the partial image and partial map in the state determination windows 1622 and 1623 as inputs, a classifier of the state determination unit 204 determines the state of flaws in a range wider than that of local determination. The classifier of the state determination unit 204 is one that outputs a defect type label with respect to an input image and flaw detection map. Since the classifier of the state determination unit 204 can be trained in a manner similar to that in the other exemplary embodiments, a detailed description thereof will be omitted. The state determination unit 204 integrates the determination results of the state of flaws in the respective portions to generate a defect state map.

FIG. 16 illustrates a state where a defect state map 1605 that is the result of the processing by the state determination unit 204 is output. The defect state map 1605 indicates that determination results 1631 and 1632 of the state of flaws are generated. The state determination results 1631 and 1632 are determined to be of defect types A and E, respectively, based on the state of flaws. In such a manner, the present exemplary embodiment can be adapted to a visual inspection apparatus.

Other Exemplary Embodiments

An exemplary embodiment of the present invention can also be implemented by processing for supplying a program for implementing one or more of the functions of the foregoing exemplary embodiments to a system or an apparatus via a network or a storage medium, and reading and executing the program by one or more processors in a computer of the system or apparatus. A circuit for implementing one or more of the functions (for example, an application specific integrated circuit (ASIC)) can also be used for implementation.

All the foregoing exemplary embodiments are merely specific examples in implementing the present invention, and are not intended to limit the interpretation of the technical scope of the present invention. In other words, the present invention can be practiced in various forms without departing from the technical idea or principle features thereof.

According to the foregoing exemplary embodiments, a state in a global range can be determined based on a local range and the global range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-068321, filed Apr. 6, 2020, which is hereby incorporated by reference herein in its entirety.

What is claimed is:

1. An information processing apparatus comprising one or more processors,
   wherein the one or more processors function as the following units:
   a detection unit configured to detect a defect occurring in a structure by using local range information about the structure based on a first image of the structure;
   a first determination unit configured to determine a global range state of the structure based on a result of detection of the defect by the detection unit and global range information indicating information about a wider area than an area of the structure indicated by the local range information, the global range information being based on a second image having a lower resolution than that of the first image; and
   a second determination unit configured to determine a degree of damage to a predetermined area of the structure based on a result of determination made by the first determination unit of the global range state of the structure.

2. The information processing apparatus according to claim 1, wherein the first determination unit is configured to determine the global range state based on a local determination map indicating the result of the detection by the detection unit as the global range information.

3. The information processing apparatus according to claim 1,
wherein the one or more processors further function as a conversion unit configured to convert a first local determination map indicating the result of the detection by the detection unit into a second local determination map, and
wherein the first determination unit is configured to determine the global range state by using the second local determination map.

4. The information processing apparatus according to claim 3, wherein the conversion unit is configured to generate the second local determination map by performing reduction processing on the first local determination map.

5. The information processing apparatus according to claim 3, wherein the conversion unit is configured to generate the second local determination map by performing thickening processing on the result of the detection by the detection unit included in the first local determination map and then performing reduction processing on the first local determination map resulting from the thickening processing.

6. The information processing apparatus according to claim 3, wherein the conversion unit is configured to generate the second local determination map based on a representative value in a filter for the first local determination map.

7. The information processing apparatus according to claim 3, wherein the conversion unit is configured to convert the result of the detection by the detection unit included in the first local determination map into vector data, and generate the second local determination map by using the vector data.

8. The information processing apparatus according to claim 1, wherein the second image is an image generated by reducing the first image.

9. The information processing apparatus according to claim 3, wherein the first determination unit is configured to determine the global range state by using the second local determination map and the second image.

10. The information processing apparatus according to claim 1, wherein the first image is a captured image of a concrete wall surface of the structure.

11. The information processing apparatus according to claim 1, wherein the one or more processors further function as a generation unit configured to generate a damage degree map with the degree of damage determined by the second determination unit as a pixel.

12. The information processing apparatus according to claim 1,
wherein the one or more processors further function as a third determination unit configured to determine an attribute of the defect occurring in the structure, the defect being detected by the detection unit, and
wherein the first determination unit is configured to determine the global range state by using the result of the detection by the detection unit and the attribute.

13. The information processing apparatus according to claim 1,
wherein the one or more processors further function as
a display control unit configured to display the result of the detection by the detection unit, and
a correction unit configured to correct the result of the detection by the detection unit based on a user's operation, and
wherein the first determination unit is configured to determine the global range state by using the result of the detection by the detection unit, the result being corrected by the correction unit.

14. The information processing apparatus according to claim 1, wherein the second determination unit is configured to determine the degree of damage based on a crack detected by the detection unit, a width of the crack, and the global range state determined by the first determination unit, the global range state indicating whether the crack detected by the detection unit is in a grid pattern or whether the crack detected by the detection unit is in a closed pattern.

15. The information processing apparatus according to claim 1, wherein the detection unit is configured to detect the defect occurring in the structure by using a partial area of the first image as the local range information, the first image being captured in resolution such that one pixel corresponds to 1 mm or more of the structure.

16. The information processing apparatus according to claim 14, wherein the first determination unit is configured to determine whether the defect detected by the detection unit is in a grid pattern or whether the defect detected by the detection unit is in a closed pattern as the global range state of the structure by using a partial area of the second image obtained by reducing the first image as the global range information, the partial area corresponding to a wider area of the structure than a partial area of the first image does.

17. The information processing apparatus according to claim 16, wherein the second determination unit is configured to determine the degree of damage based on a width of a crack detected in the structure by the detection unit, a result of detection of water leakage or free lime by the detection unit, and a result of determination made by the first determination unit about whether the crack detected by the detection unit is in a grid pattern or whether the defect detected by the detection unit is a crack in a closed pattern.

18. The information processing apparatus according to claim 1,
wherein the one or more processors further function as an estimation unit configured to estimate a width of a crack detected by the detection unit,
wherein the first determination unit is configured to determine a state of configuration of the crack detected by the detection unit as the global range state, and
wherein the second determination unit is configured to determine the degree of damage based on the width of the crack and the state of configuration of the crack.

19. An information processing method comprising:
detecting a defect occurring in a structure by using local range information about the structure based on a first image of the structure;
determining a global range state of the structure based on a result of the detection of the defect and global range information indicating information about a wider area than an area of the structure indicated by the local range information, the global range information being based on a second image having a lower resolution than that of the first image; and
determining a degree of damage to a predetermined area of the structure based on a result of the determination of the global range state of the structure.

20. A non-transitory computer-readable storage medium storing a program for causing a computer to perform an information processing method, the method comprising:
detecting a defect occurring in a structure by using local range information about the structure based on a first image of the structure;

determining a global range state of the structure based on a result of the detection of the defect and global range information indicating information about a wider area than an area of the structure indicated by the local range information, the global range information being based on a second image having a lower resolution than that of the first image; and determining a degree of damage to a predetermined area of the structure based on a result of the determination of the global range state of the structure.

\* \* \* \* \*